US011295173B2

(12) United States Patent
Umeno et al.

(10) Patent No.: US 11,295,173 B2
(45) Date of Patent: Apr. 5, 2022

(54) IMAGE IDENTIFICATION APPARATUS, IMAGE IDENTIFICATION METHOD, AND RECORDING MEDIUM

(71) Applicant: Morpho, Inc., Tokyo (JP)

(72) Inventors: Takuma Umeno, Chiyoda-ku (JP); Takafumi Yuasa, Chiyoda-ku (JP)

(73) Assignee: Morpho, Inc., Tokyo (JP)

( * ) Notice: Subject to any disclaimer, the term of this patent is extended or adjusted under 35 U.S.C. 154(b) by 87 days.

(21) Appl. No.: 16/551,249

(22) Filed: Aug. 26, 2019

(65) Prior Publication Data

US 2020/0074238 A1    Mar. 5, 2020

(30) Foreign Application Priority Data

Aug. 28, 2018   (JP) .............................. JP2018-159603

(51) Int. Cl.
  *G06K 9/62*   (2006.01)
(52) U.S. Cl.
  CPC ......... *G06K 9/6262* (2013.01); *G06K 9/6215* (2013.01); *G06K 9/6256* (2013.01); *G06K 9/6267* (2013.01)
(58) Field of Classification Search
  CPC .... G06K 9/6201; G06K 9/6215; G06K 9/621; G06K 9/6212; G06K 9/6214;
  (Continued)

(56) References Cited

U.S. PATENT DOCUMENTS

2005/0286772 A1   12/2005  Albertelli
2013/0117365 A1*   5/2013  Padmanabhan ......... H04W 4/02
                                              709/204
(Continued)

FOREIGN PATENT DOCUMENTS

JP      2010-8159 A    1/2010
JP      2016-4549 A    1/2016
(Continued)

OTHER PUBLICATIONS

Toshikazu Wada, "Detection and Tracking of Target with Image", Image Labo, Japan Industrial Partial Publishing Co., Ltd. vol. 17, No. 7, Jul. 2006, p. 60-p. 63 (total 5 pages).

*Primary Examiner* — Sean M Conner
*Assistant Examiner* — Stephen M Brinich
(74) *Attorney, Agent, or Firm* — Sughrue Mion, PLLC

(57) ABSTRACT

An image identification apparatus includes an acquisition unit configured to acquire an input image, a classification unit configured to calculate a classification score of the input image based on a neural network having a weight coefficient in each layer determined to calculate the classification score indicating a degree of similarity between a training image and an image to be processed, an anomaly determination unit configured to calculate an anomaly score of the input image based on a function approximator constructed by machine learning based on the training image of correct answer, and an identification unit configured to classify the input image into a good image having a high degree of similarity to the training image of the correct answer or a bad image having low degree of similarity to the training image of correct answer based on the classification score and the anomaly score.

14 Claims, 17 Drawing Sheets

(58) Field of Classification Search
CPC .... G06K 9/6255; G06K 9/6256; G06K 9/626; G06K 9/6262; G06K 9/6267; G06K 9/6268; G06K 9/6269; G06K 9/627
USPC .................................................. 382/155–161
See application file for complete search history.

(56) References Cited

U.S. PATENT DOCUMENTS

| | | | |
|---|---|---|---|
| 2017/0300785 A1* | 10/2017 | Merhav | G06N 3/08 |
| 2019/0295252 A1* | 9/2019 | Fuchs | G06N 20/00 |
| 2019/0384987 A1* | 12/2019 | Li | G06K 9/00744 |
| 2020/0050893 A1* | 2/2020 | Suresh | G06K 9/6256 |
| 2020/0250491 A1* | 8/2020 | Peng | G06K 9/00617 |

FOREIGN PATENT DOCUMENTS

| | | |
|---|---|---|
| JP | 2016-133953 A | 7/2016 |
| JP | 2017-84320 A | 5/2017 |
| JP | 2018-49355 A | 3/2018 |

\* cited by examiner

IMAGE IDENTIFICATION APPARATUS, IMAGE IDENTIFICATION METHOD, AND RECORDING MEDIUM

CROSS-REFERENCE TO RELATED APPLICATION

This application is based on Japanese Patent Application No. 2018-159603 filed with Japan Patent Office on Aug. 28, 2018, the entire contents of which are hereby incorporated by reference.

BACKGROUND

Field of Invention

The present invention relates to an image identification apparatus, an image identification method, an image identification program, and a recording medium.

Background Arts

Japanese Patent Laid-Open No. 2017-084320 discloses a classifier trained in advance with labeled training images. In this type of image identification technique, even when the difference in feature values between the training image and an input image is small, the input image can be identified with high accuracy.

Japanese Patent Laid-Open No. 2016-004549 discloses an autoencoder which compresses information included in an input image and then reconstructs the information included in the training image by learning a training image in advance. By comparing the input image with the image reconstructed by the autoencoder, the degree of difference between the input image and the training image can be derived.

SUMMARY OF INVENTION

In the manufacturing industry, quality of a product may be inspected using an image in which a subject is a product. In the manufacturing process, not only defective products similar to the assumed defective products but also sudden defective products unprecedented in the past may be manufactured. Alternatively, there is a case where an image in which a subject is not photographed becomes an inspection target due to a failure of the imaging apparatus. Therefore, the image inspection apparatus is required to have an inspection capability capable of detecting accurately whether an input image belongs to a good category indicating a non-defective product or belongs to a bad category indicating any defective product other than a non-defective product.

However, in the image identification technique described in Japanese Patent Laid-Open No. 2017-084320, when the difference between feature values of the input image and the feature value of any of the plurality of training images is remarkably large, there is a possibility that the accuracy of image identification is lowered, for example, the input image is identified as belonging to a good category. On the other hand, in the image identification technique described in Japanese Patent Laid-Open No. 2016-004549, when the difference between feature values of the input image and the training image is small, it may be difficult to identify a defect of the input image with high accuracy, for example, the input image is identified as belonging to a good category. As described above, in the technologies described in Japanese Patent Laid-Open No. 2017-084320 and Japanese Patent Laid-Open No. 2016-004549, depending on the difference between feature values of the input image and the training image, there is a possibility that the defect of the input image cannot be identified with high accuracy.

An image identification apparatus according to an aspect of the present invention is an image identification apparatus includes: an acquisition unit configured to acquire an input image; a classification unit configured to calculate a classification score of the input image based on a neural network having a weight coefficient in each layer determined to calculate the classification score indicating a degree of similarity between a training image and an image to be processed by machine learning based on the training images of correct and incorrect answers; an anomaly determination unit configured to calculate an anomaly score of the input image based on a function approximator constructed by machine learning based on the training image of correct answer to calculate the anomaly score indicating a degree of difference between the training image of the correct answer and the image to be processed; and an identification unit configured to classify the input image into a good image having a high degree of similarity to the training image of the correct answer or a bad image having low degree of similarity to the training image of correct answer based on the classification score calculated by the classification unit and the anomaly score calculated by the anomaly determination unit.

According to various aspects and embodiments of the present disclosure, an input image can be identified with high accuracy between a good image having a high degree of similarity to a training image of a correct answer and a bad image having a low degree of similarity to a training image of a correct answer.

DESCRIPTION OF EMBODIMENTS

Figure 1:
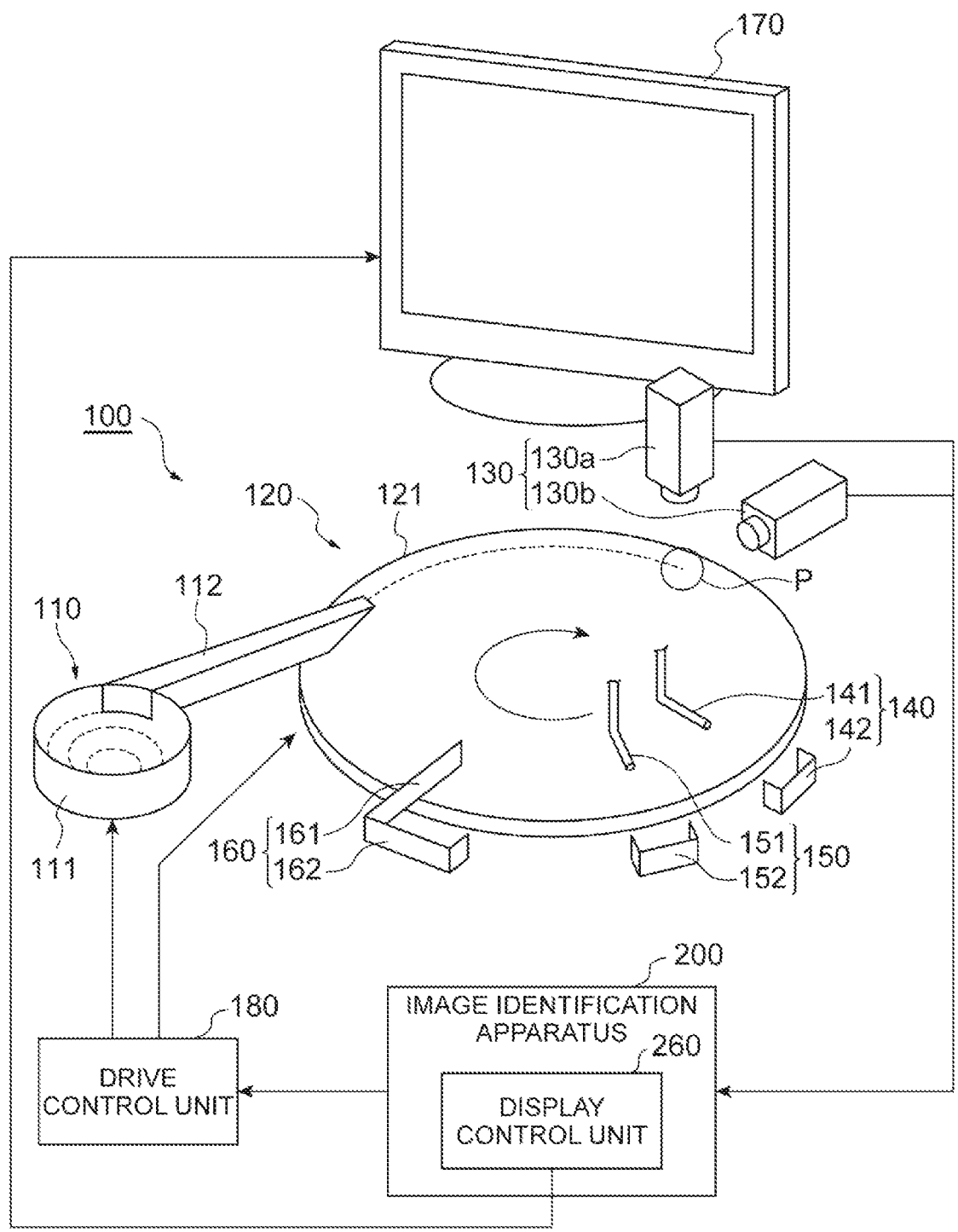
FIG. 1 is a perspective view illustrating an appearance inspection apparatus including an image identification apparatus according to the present embodiment.

Hereinafter, embodiments of the present disclosure will be described in detail with reference to the accompanying drawings. The same or corresponding elements are assigned the same reference numerals, and redundant description thereof will be omitted.

[Overview of Appearance Inspection Apparatus]

FIG. 1 is a perspective view illustrating an appearance inspection apparatus including an image identification apparatus according to the present embodiment. The appearance inspection apparatus 100 illustrated in FIG. 1 is an apparatus for inspecting whether an electronic component P is a non-defective product or a defective product based on an image obtained by photographing the appearance of the electronic component P. The appearance inspection apparatus 100 includes a supply unit 110, a conveyance unit 120, a camera 130, a defective product discharge mechanism 140, an indistinguishable product discharge mechanism 150, a non-defective product discharge mechanism 160, a display unit 170, a drive control unit 180, and an image identification apparatus 200.

The supply unit 110 has a mechanism for supplying the electronic components P sequentially to be inspected. The supply unit 110 includes a ball feeder 111 and a linear feeder 112. The ball feeder 111 includes a mortar-shaped container that accommodates a plurality of electronic components P, and feeds out the electronic components P in the container one by one while aligning them along the peripheral wall of the container by using centrifugal force. The linear feeder 112 sequentially feeds the electronic components P fed from the ball feeder 111 toward the conveying unit 120.

The conveying unit 120 includes a rotary table 121. The conveyance unit 120 conveys the electronic component P supplied from the supply unit 110 by placing the electronic component P on the peripheral portion of the upper surface of the rotary table 121. The rotary table 121 is rotationally driven at a constant speed by a drive motor (not shown). The arrows drawn on the rotary table 121 in FIG. 1 indicate the rotation direction of the rotary table 121. The electronic component P is placed on the upper surface of the rotary table 121 of the conveyance unit 120, passes through the imaging point of the camera 130, and is conveyed to the defective product discharge mechanism 140, the indistinguishable product discharge mechanism 150, or the non-defective product discharge mechanism 160.

The camera 130 captures an image of the electronic component P on the rotary table 121 and generates an image. The camera 130 includes a camera 130a and a camera 130b. The camera 130a is installed at a position facing the upper surface of the rotary table 121. The camera 130a captures an image of the upper surface of the electronic component P. The camera 130b is installed at a position facing the outer periphery of the rotary table 121. The camera 130b captures an image of a surface facing the outer periphery of the electronic component P. The camera 130a and the camera 130b are installed at positions separated by a predetermined distance respectively. The electronic components P sequentially conveyed by the rotary table 121 are sequentially imaged on the respective surfaces by the camera 130.

The defective product discharge mechanism 140 discharges the electronic component P determined to be defective by the image identification apparatus 200. The defective product discharge mechanism 140 is installed downstream of the camera 130 as viewed from the supply unit 110 in the rotation direction of the rotary table 121. The defective product discharge mechanism 140 includes an air nozzle 141 and a chute 142. The air nozzle 141 is installed above the rotary table 121 so as to face the chute 142. The air nozzle 141 selectively outputs a predetermined amount of air under the control of a drive control unit 180 described later. The chute 142 collects the electronic component P to be inspected blown off by the air nozzle 141.

The indistinguishable product discharge mechanism 150 has a function of discharging the electronic component P determined to be an indistinguishable product by the image identification device 200. The indistinguishable product discharge mechanism 150 is installed downstream of the camera 130 as viewed from the supply unit 110 in the rotation direction of the rotary table 121. The indistinguishable product discharge mechanism 150 includes an air nozzle 151 and a chute 152. The air nozzle 151 is installed above the rotary table 121 so as to face the chute 152. The air nozzle 151 selectively outputs a predetermined amount of air under the control of a drive control unit 180 described later. The chute 152 collects the electronic component P to be inspected blown off by the air nozzle 151. In the defective product discharge mechanism 140 and the indistinguishable product discharge mechanism 150, the order of installation of the rotary table 121 with respect to the rotation direction may be either first.

The non-defective product discharge mechanism 160 discharges the electronic component P determined to be a non-defective product by the image identification apparatus 200. The non-defective product discharge mechanism 160 is provided on the most downstream side with respect to the supply unit 110 in the rotation direction of the rotary table 121. The non-defective discharge mechanism 160 includes a guide 161 and a chute 162. The guide 161 guides the electronic component P remaining on the rotary table 121 to the chute 162. The chute 162 drops and collects the electronic component P guided by the guide 161.

The display unit 170 displays a result of a non-defective product or a defective product, a threshold, and the like based on the control of the display control unit 260 in the image identification apparatus 200, which will be described later. The display unit 170 is, for example, a display device.

The drive control unit 180 controls a drive unit 181 (see FIG. 2) including an air valve and the like. The drive control unit 180 causes any one of the defective product discharge mechanism 140, the non-distinguishable product discharge mechanism 150, and the non-defective product discharge mechanism 160 to collect the electronic component P based on the determination result of the identification unit 250 in the image identification apparatus 200, which will be described later. When it is determined that the electronic component P is to be collected by the defective product discharge mechanism 140 or the indistinguishable product discharge mechanism 150, the drive control unit 180 causes the air nozzle 141 or the air nozzle 151 to output a predetermined amount of air through the drive unit 181.

[Basic Operation of Appearance Inspection Apparatus]

First, as the operation of the appearance inspection apparatus 100, a process of acquiring an image of the electronic component P to be inspected will be described. In the appearance inspection apparatus 100, the electronic component P is supplied to the conveyance unit 120 by the supply unit 110. The electronic component P is mounted on the peripheral portion of the upper surface of the rotary table 121 and conveyed. At the time of mounting, the electronic component P is charged and attracted to the rotary table 121 by static electricity. Next, the electronic component P is conveyed to the position of the camera 130 by the conveyance of the rotary table 121. The electronic component P is imaged by the camera 130. An image having the electronic component P as a subject is sent to the image identification apparatus 200. An image in which the upper surface of the electronic component P is a subject can be acquired by the camera 130a. An image in which the front surface or the side surface of the electronic component P is an object can be acquired by the camera 130b.

Next, a process of sorting the electronic component P to be inspected based on the result of the image identification process in the image identification apparatus 200 will be described. When it is determined that the electronic component P is defective, the drive control unit 180 controls the drive unit 181 so as to output a predetermined amount of air from the air nozzle 141. The electronic component P is blown off by the air output from the air nozzle 141, and falls into the chute 142. Similarly, when it is determined that the electronic component P cannot be identified, the drive control unit 180 controls the drive unit 181 so as to output a predetermined amount of air from the air nozzle 151. The electronic component P is blown off by the air output from the air nozzle 151, and falls into the chute 152. As described above, the electronic component P determined to be defective or indistinguishable is excluded from the rotation table 121. The electronic components P determined to be non-defective remain in the rotation table 121. The electronic component P determined to be non-defective is guided by the guide 161 and dropped into the chute 162.

[Functional Diagram of Image Identification Apparatus]

Figure 2:
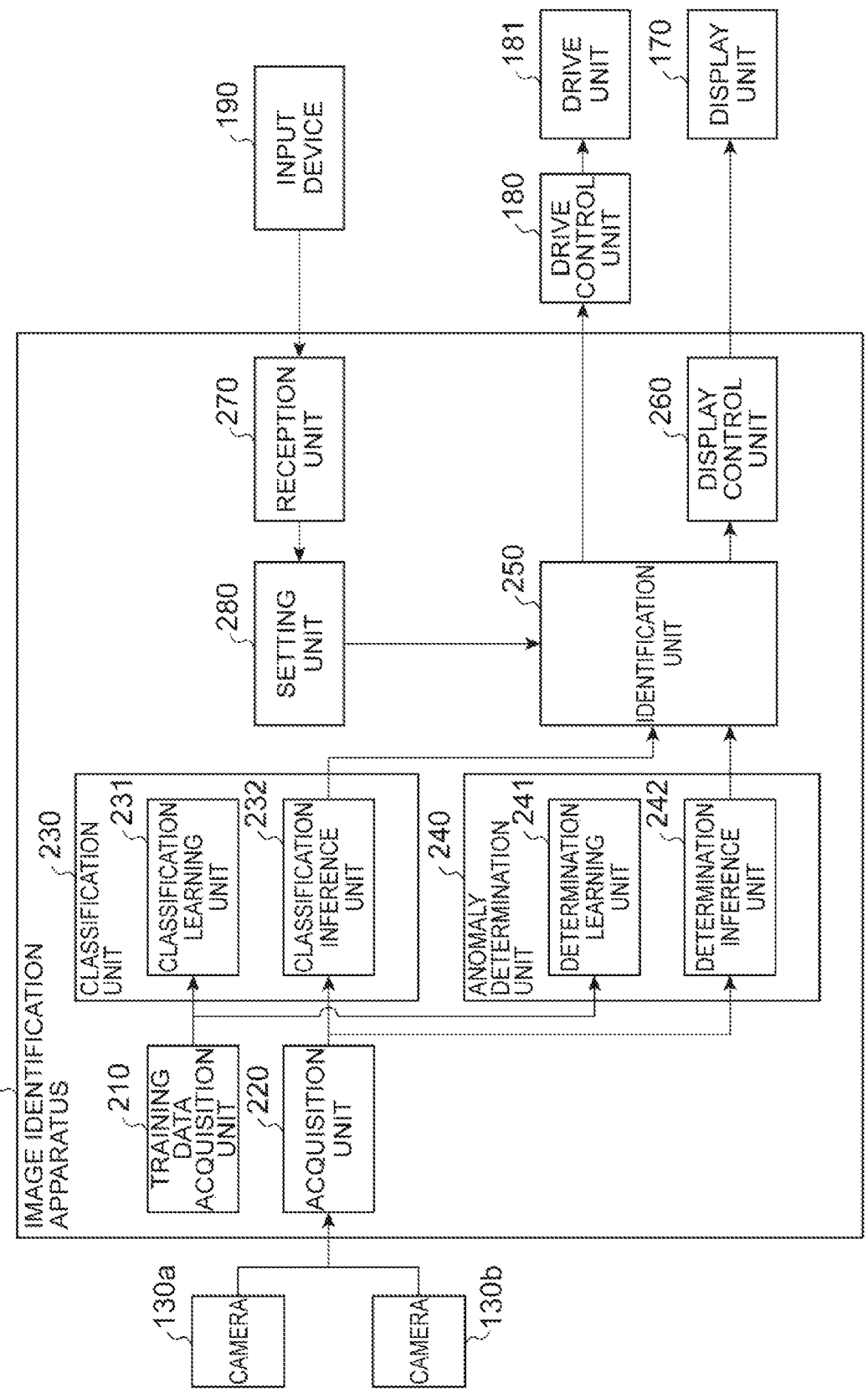
FIG. 2 is a functional block diagram of the image identification apparatus according to the present embodiment.

FIG. 2 is a block diagram illustrating an example of the function of the image identification apparatus 200 according to the embodiment. The image identification apparatus 200 identifies an image in which the subject (electronic component P) included in the input image is a non-defective object and an image in which the subject (electronic component P) is a defective object. The input image to be identified is an image acquired by the camera 130 in the above-described appearance inspection apparatus 100.

The image identification apparatus 200 includes a training data acquisition unit 210, an acquisition unit 220, a classification unit 230, an anomaly determination unit 240, and an identification unit 250.

The image identification apparatus 200 includes a training data acquisition unit 210, an acquisition unit 220, a classification unit 230, an anomaly determination unit 240, and an identification unit 250. The training data acquisition unit 210 acquires a training image to which a label of correct answer is given and a training image to which a label of incorrect answer is given. Here, the label means information associated with an image. In the present embodiment, when a correct label is given to the training image, it indicates that the electronic component P which is the subject of the training image is a non-defective product. When an incorrect label is attached to the training image, it indicates that the electronic component P which is the subject of the training image is a defective product. The training image is an image including an electronic component P of the same type as that of the electronic component P which is the subject of the camera 130 described above. The training data acquisition unit 210 may acquire a training image from a data server (not shown) via communication, or may acquire a training image by referring to an external storage medium connectable to the image identification apparatus 200 or a storage medium included in the image identification apparatus 200. The required number of training images is not particularly limited.

The acquisition unit 220 acquires an input image obtained by the camera 130. The acquisition unit 220 may perform pre-processing such as cropping or resizing on the input image.

The classification unit 230 includes a classification learning unit 231 and a classification inference unit 232. The classification learning unit 231 trains the neural network with the features of the subject regarded as the correct answer and the features of the subject regarded as the incorrect answer, based on the training image to which the label of the correct answer is given and the training image to which the label of the incorrect answer is given, which are acquired by the training data acquisition unit 210. Then, when an image to be processed is input, the trained neural network acquires the ability to calculate a score indicating the likelihood that the subject is a non-defective product and a score indicating the likelihood that the subject is a defective product.

In the extraction of the features of the training image, the training image is converted into feature vectors of a predetermined dimension. In the classification of the features, an identification plane on a hyperplane is formed which separates the feature vector extracted from the training image to which the correct label is given and the feature vector extracted from the training image to which the incorrect label is given. The classification learning unit 231 repeats the process of determining whether the feature vector extracted from the training image belongs to either of the "good category indicating a non-defective product" and the "bad category indicating any defective product other than a non-defective product" repeatedly in the neural network. At this time, a weight coefficient in each layer of the neural network is adjusted. This allows the neural network to gain the ability to correctly classify them.

The neural network in the classification unit 230 outputs a score indicating the likelihood that the feature vector extracted from the input image belongs to a good category (hereinafter referred to as a "good score") and a score indicating the likelihood that the feature vector belongs to a bad category (hereinafter referred to as a "bad score"). In the present embodiment, each of the good score and the bad score has a value in the range of 0.0 to 1.0, and the sum of the good score and the defect score is set to 1.0. With respect to the training image to which the label of the correct answer is given, the training of the neural network is performed so that the good score approaches 1.0 and the bad score approaches 0.0. On the other hand, with respect to the training image to which the label of the incorrect answer is given, the training of the neural network is performed so that the good score approaches 0.0 and the bad score approaches 1.0. As described above, the training of the classification learning unit 231 is so-called supervised learning. When the training by the classification learning unit 231 is completed, the weight coefficient may not be changed thereafter. In the present embodiment, among the good score and the bad score output from the neural network, the good score is used as the classification score. Each of these is an index indicating the degree of similarity with the training image, and the bad score may be used as the classification score.

The classification inference unit 232 performs an examination (inference) using the neural network that has been previously trained by the classification learning unit 231. The classification inference unit 232 calculates a classification score based on the neural network constructed by the classification learning unit 231 and the input image acquired by the acquisition unit 220.

The anomaly determination unit 240 includes a determination learning unit 241 and a determination inference unit 242. The determination learning unit 241 trains a predetermined function approximator with the relationship between the input and the output by machine learning. The training image to be learned by the anomaly determination unit 240 is an image in which the subject is a non-defective. The training image may be an image obtained by photographing a non-defective electronic component P by the camera 130, or may be the same image as the training image input to the classification unit 230 and to which the label of the correct answer is given. That is, in the training by the determination learning unit 241, unlike the training by the classification learning unit 231, only a training image of a correct answer is required.

A neural network can be applied to the function approximator related to the anomaly determination unit 240 in the same manner as the classification unit 230. The determination learning unit 241 trains the neural network with the feature of the training image based on the training image acquired by the training data acquisition unit 210. Then, the trained neural network acquires the ability to reconstruct the information of the training image (e.g., feature value) after compressing the information of the image to be processed when the image to be processed is input. The determination inference unit 242 inputs the image acquired by the acquisition unit 220 to the trained neural network, and acquires an image reconstructed from the input image as an output. Thus, a technique of compressing and reconstructing information of input data using a neural network is widely known as an autoencoder. In the present embodiment, such an autoencoder can be applied to the anomaly determination unit 240.

Alternatively, a One Class SVM (Support Vector Machine) may be applied to the function approximator of the anomaly determination unit 240. The determination learning unit 241 trains the SVM with the feature of the training image based on the training image acquired by the training data acquisition unit 210. Then, the trained SVM acquires the ability to separate the feature space into an area in which a feature vector extracted from an image having a low degree of difference from the training image is plotted and an area in which a feature vector extracted from an image having a high degree of difference from the training image is plotted. The determination inference unit 242 first extracts a feature vector from the input image acquired by the acquisition unit 220. Next, the determination inference unit 242 determines in which area the feature vector extracted from the input image is plotted. When the feature vector extracted from the input image is plotted in an area having a high degree of difference from the training image, the determination inference unit 242 can recognize that an anomaly is included in the subject of the input image. Here, the anomaly means not only that the subject is a defective product, but also that the subject is extremely different from the training image, for example, the subject does not appear at all or a different type of subject appears.

The anomaly determination unit 240 calculates an anomaly score indicating the degree of difference from the training image based on the function approximator constructed by machine learning and the input image. As an example, as the degree of difference between the input image and the training image (reconstructed image) is larger, the anomaly score is closer to "1.0", and as the degree of difference between the input image and the training image (reconstructed image) is smaller, the anomaly score is closer to "0.0". When the anomaly score is calculated using an autoencoder, a plurality of terms are calculated from the correlation between the pixel values of the input image and the reconstructed image. Then, a coefficient is given to each of the calculated terms, and the coefficient is normalized to a range of 0.0 to 1.0 after the linear calculation, thereby finally calculating an anomaly score. When the SVM is used to calculate the anomaly score, a plurality of terms are calculated from statistical quantities such as an average and a variance based on the difference between the pixel values of the training image and the input image. Then, a coefficient is given to each of the calculated terms, and the coefficient is normalized to a range of 0.0 to 1.0 after the linear calculation, thereby finally calculating an anomaly score. The method of calculating the anomaly score is not limited to the above. In addition, in the case of calculating the anomaly score using the SVM, the anomaly determination unit 240 calculates the anomaly score only when it is recognized that an anomaly is included in the subject of the input image. As described above, it is possible to reduce the calculation cost for calculating the anomaly score.

Based on the classification score calculated by the classification inference unit 232 and the anomaly score calculated by the determination inference unit 242, the identification unit 250 classifies the input image acquired by the acquisition unit 220 into a good image having a high degree of similarity to the training image of the correct answer or a bad image having a low degree of similarity to the training image of the correct answer. The classification of the input image into a good image or a bad image by the identification unit 250 includes not only the case where the identification unit 250 classifies the input image into either a good image or a bad image, but also the case where the input image is classified into a good image, a bad image, and other categories. An example of another category is an indistinguishable category, which is neither a good image nor a bad image. The identification unit 250 may classify the input image into a good image or a bad image based on a classification score threshold 801 (see FIG. 8) predetermined for the classification score and an anomaly score threshold 802 (see FIG. 8) predetermined for the anomaly score. The classification score threshold 801 is a predetermined index for evaluating the classification score. The anomaly score threshold 802 is a predetermined index for evaluating an anomaly score. By setting the classification score threshold 801 and the anomaly score threshold 802, a uniform criterion is provided for a plurality of input images.

The image identification apparatus 200 may include a reception unit 270 and a setting unit 280. The appearance inspection apparatus 100 may have an input device 190 external to the image identification device 200. The input device 190 is a mouse, a keyboard, a touch panel, or the like. The reception unit 270 accepts a user operation. The user operation is an operation by a user operating the input device 190, and is, for example, a selection operation by a mouse, an input operation by a keyboard, a selection operation by a touch panel, or an input operation. The setting unit 280 sets the classification score threshold 801 and the anomaly score threshold 802 based on the user operation received by the reception unit 270. By setting the classification score threshold 801 and the anomaly score threshold 802 by the user, it is possible to adjust the criterion so that the appearance inspection is close to the visual inspection. The classification score threshold 801 and the anomaly score threshold 802 may be calculated by a predetermined calculation formula using the classification score and the anomaly score of the input image already acquired by the classification unit 230 and the anomaly determination unit 240.

The image identification apparatus 200 may include a display control unit 260. The display control unit 260 causes the display unit 170 to display a scatter area 800 (see FIG. 8) having the classification score evaluation axis related to the classification score and the anomaly score evaluation axis related to the anomaly score as coordinate axes. The display control unit 260 displays the data having the classification score and the anomaly score of the input image as coordinates, the classification score threshold 801, and the anomaly score threshold 802 in the scatter area 800. In the display unit 170, the obtained data is visualized in the scatter area 800, thereby facilitating confirmation of the variation in quality of the subject in the input image, review of the setting of the classification score threshold 801 and the anomaly score threshold 802.

[Hardware Components of Image Identification Apparatus]

Figure 3:
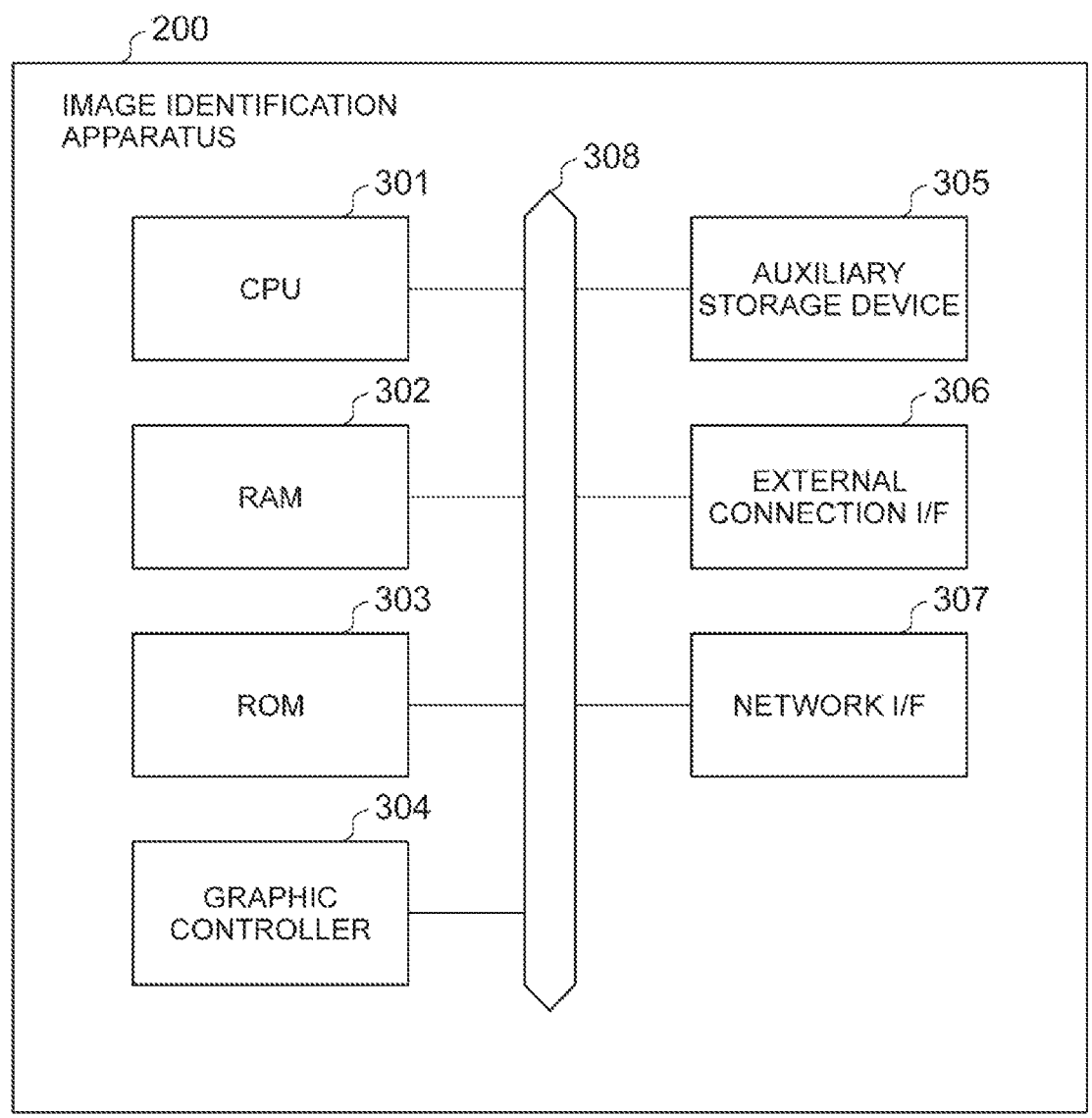
FIG. 3 is a block diagram illustrating hardware components of the image identification apparatus.

FIG. 3 is a block diagram illustrating hardware components of the apparatus shown in FIG. 2. As illustrated in FIG. 3, the image identification apparatus 200 is configured as a normal computer system including a CPU (Central Processing Unit) 301, a RAM (Random Access Memory) 302, a ROM (Read Only Memory) 303, a graphics controller 304, an auxiliary storage device 305, an external connection interface 306 (hereinafter referred to as an "I/F"), a network I/F 307, and a bus 308.

The CPU 301 is composed of arithmetic circuits and performs overall control of the image identification apparatus 200. The CPU 301 reads the programs stored in the ROM 303 or an auxiliary storage device 305 to the RAM 302. The CPU 301 executes various processes in the programs read out to the RAM 302. The ROM 303 stores a system program and the like used for controlling the image identification apparatus 200. The graphic controller 304 generates a screen to be displayed on the display unit 170. The auxiliary storage device 305 functions as a storage device. The auxiliary storage device 305 memories application programs and the like for executing various processes. The auxiliary storage device 305 includes, for example, an HDD (Hard Disk Drive), an SSD (Solid State Drive), and the like. The external connection I/F 306 is an interface for connecting various devices to the image identification apparatus 200. The external connection I/F 306 connects, for example, the image identification apparatus 200, a display, a keyboard, a mouse, and the like. The display unit 170 and the input device 190 include an external connection I/F. The network I/F 307 communicates with the image identification apparatus 200 and the like via the network under the control of the CPU 301. Each of the above-described components is communicably connected via a bus 308. The functions of the image identification apparatus 200 shown in FIG. 2 are realized by the hardware shown in FIG. 3.

The image identification apparatus 200 may include hardware other than the hardware described above. The image identification apparatus 200 may include, for example, a GPU (Graphics Processing Unit), a FPGA (Field-Programmable Gate Array), a DSP (Digital Signal Processor), and the like. The image identification apparatus 200 does not need to be housed in a single housing as hardware, and may be separated into several apparatuses.

[Details of the Neural Network Related to the Classification Unit]

Figure 4:
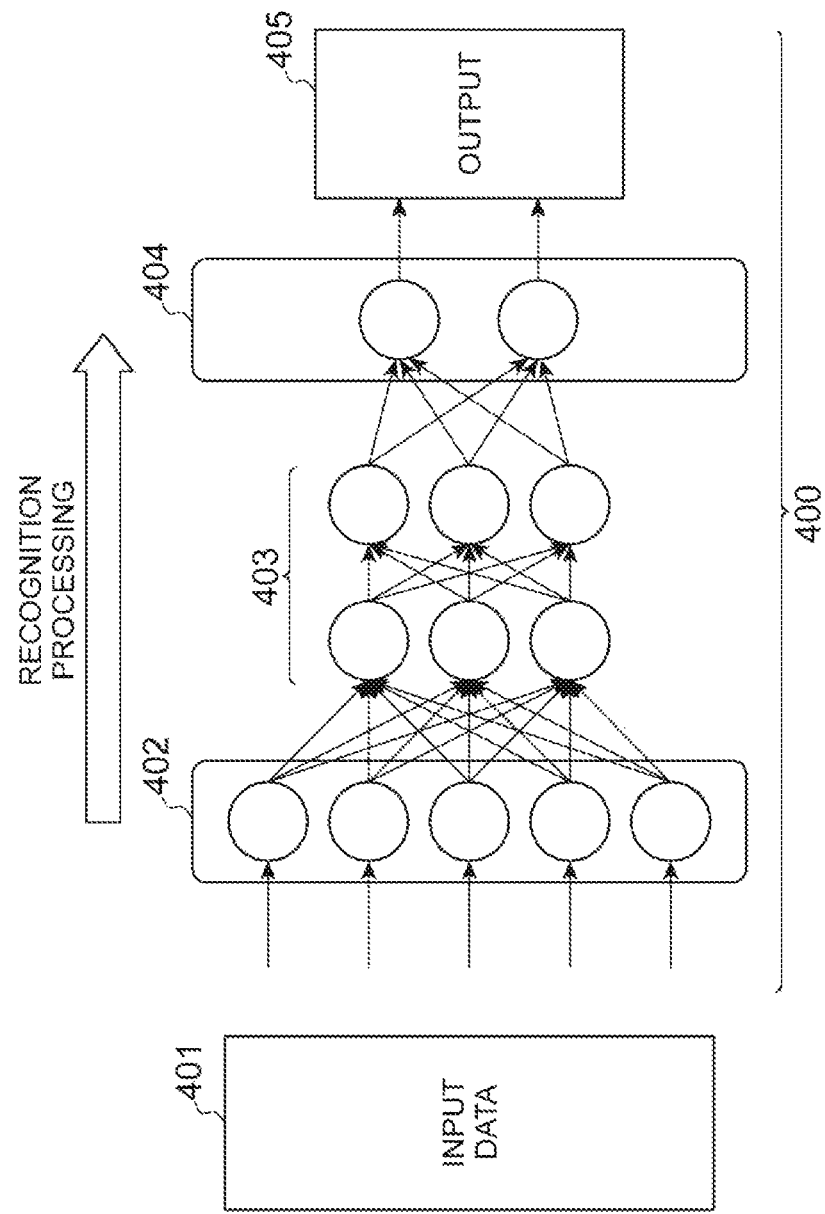
FIG. 4 is a schematic diagram of a neural network in a classification unit.

FIG. 4 is a schematic diagram of a neural network in the classification unit 230. As illustrated in FIG. 4, the neural network 400 in the classification unit 230 is a so-called hierarchical neural network, and a number of artificial neurons (nodes) shown by circles are connected to form a hierarchy. The hierarchical neural network comprises artificial neurons for input, artificial neurons for processing and artificial neurons for output.

The input data 401, which is a training image, is acquired by the training data acquisition unit 210. The input data 401 is sent from the training data acquisition unit 210 to the classification learning unit 231. The input data 401 is acquired by artificial neurons for input in the input layer 402. The artificial neurons for input are arranged in parallel to form the input layer 402. The input data 401 is distributed to artificial neurons for processing. The signal itself exchanged in the neural network is called a score. The score is numerical.

The artificial neurons for processing are connected to the artificial neurons for input. The artificial neurons for processing are arranged in parallel to form the intermediate layer 403. The intermediate layer 403 may be a plurality of layers. The neural network of three or more layers including the intermediate layer 403 is referred to as a deep neural network.

A convolutional neural network is preferably used as the neural network in the classification unit 230. The convolutional neural network is a deep neural network formed by alternately connecting convolution layers and pooling layers. The sequential processing of the convolution layer and the pooling layer reduces the input image while retaining features such as edges. When the convolutional neural network is applied to image analysis, the classification of images can be performed with high accuracy based on the extracted features.

The artificial neuron for output outputs a score to the outside. In the example of FIG. 4, the good score and the bad score are output from the artificial neuron for output. In other words, two artificial neurons, an artificial neuron for outputting a good score and an artificial neuron for outputting a bad score, are prepared in the output layer 404. In the present embodiment, each of the good score and the bad score has a value in the range of 0.0 to 1.0, and the sum of the good score and the bad score is set to 1.0. In the classification learning (S900) to be described later, the neural network 400 is trained so that the training images to which labels of correct answers are given have a good score of 1.0 and a bad score of 0.0. On the other hand, with respect to the training image to which the label of the incorrect answer is given, the neural network 400 is trained so that the good score approaches 0.0 and the bad score approaches 1.0. In the present embodiment, the good score output from the output layer 404 is used as the classification score.

The classification learning unit 231 trains the neural network with a training image to which a label of a correct answer or a label of an incorrect answer is given in advance. As a result, in the intermediate layer 403, artificial neurons for processing for which weight coefficients are determined are formed. The trained neural network is applied to the classification inference unit 232. In the classification inference unit 232, the input layer 402 acquires an input image and distributes it to artificial neurons for processing of the intermediate layer 403. The artificial neurons for processing in the intermediate layer 403 process the input using the trained weight coefficients and convey the output to other neurons. When the score is transmitted from the intermediate layer 403 to the output layer 404, the output layer 404 outputs the classification score to the outside. The classification score indicates the degree of similarity of the input image to the training image to which the correct or incorrect label is given. The closer the classification score is to "1", the higher the degree of similarity of the correct answer to the training image.

[Feature Value in Classification]

Figure 5A:
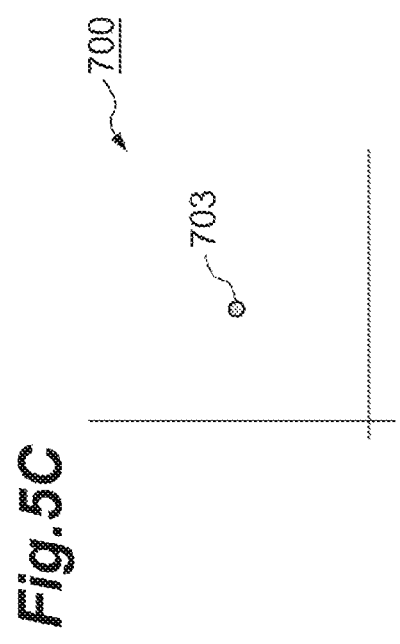
FIGS. 5A to 5D are schematic diagrams illustrating learning and inference in the classification unit.
Figure 5C:
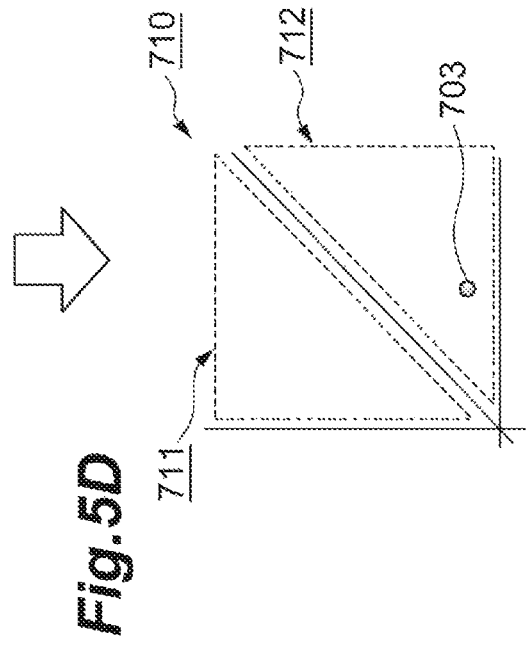
Figure 5B:
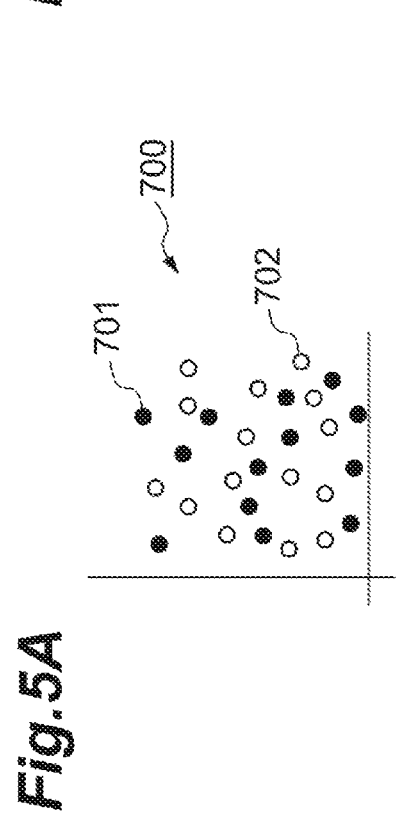
Figure 5D:
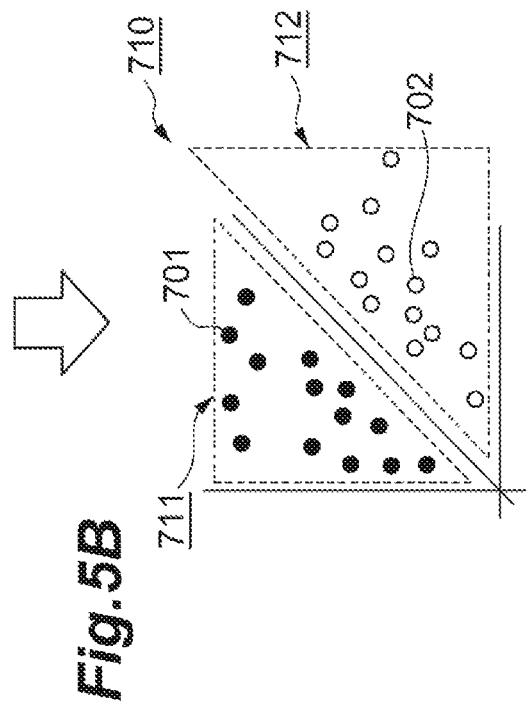

FIGS. 5A to 5D are schematic diagrams illustrating learning and inference in the classification unit 230. FIGS. 5A and 5B are examples of graphs illustrating the feature value (feature vector) at the time of learning, and FIGS. 5C and 5D are examples of graphs illustrating the feature value (feature vector) at the time of inference (inspection).

FIG. 5A is an example of a graph in which the feature value (feature vector) of the training image extracted by the classification learning unit 231 is plotted in a high-dimensional space. In FIG. 5A, a feature value 701 of a training image to which a label of correct answer is given and a feature value 702 of a training image to which a label of incorrect answer is given are plotted in a high-dimensional space 700. In the high-dimensional space 700, the feature value 701 and the feature value 702 are irregularly dispersed. The classification learning unit 231 projects the feature value of the training image in the two-dimensional space in order to derive the likelihood that the feature value of the training image belongs to the good category and the likelihood that the feature value belongs to the bad category. FIG. 5B is a graph in which the feature value of the training image of FIG. 5A is projected onto a two-dimensional space. As illustrated in FIG. 5B, the feature value 701 of the training image to which the label of the correct answer is given and the feature value 702 of the training image to which the label of the incorrect answer is given form a point group. A separating hyperplane bounding the point group is obtained by learning. The area above the boundary is a good category area 711, and the area below the boundary is a bad category area 712.

FIG. 5C is an example of a graph in which the feature value (feature vector) of the input image extracted by the classification inference unit 232 is plotted in a high-dimensional space. In FIG. 5C, the feature value 703 of the input image is plotted in the high-dimensional space 700. The classification inference unit 232 projects the feature value of the input image into the two-dimensional space in order to derive the likelihood that the feature value of the input image belongs to the good category and the likelihood that the feature value belongs to the bad category. FIG. 5D is a graph in which the feature value of the input image of FIG. 5C is projected in the two-dimensional space. The classification inference unit 232 determines in which area the feature value of the input image belongs using the boundary acquired in FIG. 5B. For example, when the feature value is plotted in the good category area 711, it is determined that the input image belongs to the good category, and when the feature value is plotted in the bad category area 712, it is determined that the input image belongs to the bad category. In the example of FIG. 5D, since the feature value 703 is plotted in the bad category area 712, it is determined that the input image belongs to the bad category.

[Details of the Neural Network Related to the Anomaly Determination Unit]

Figure 6:
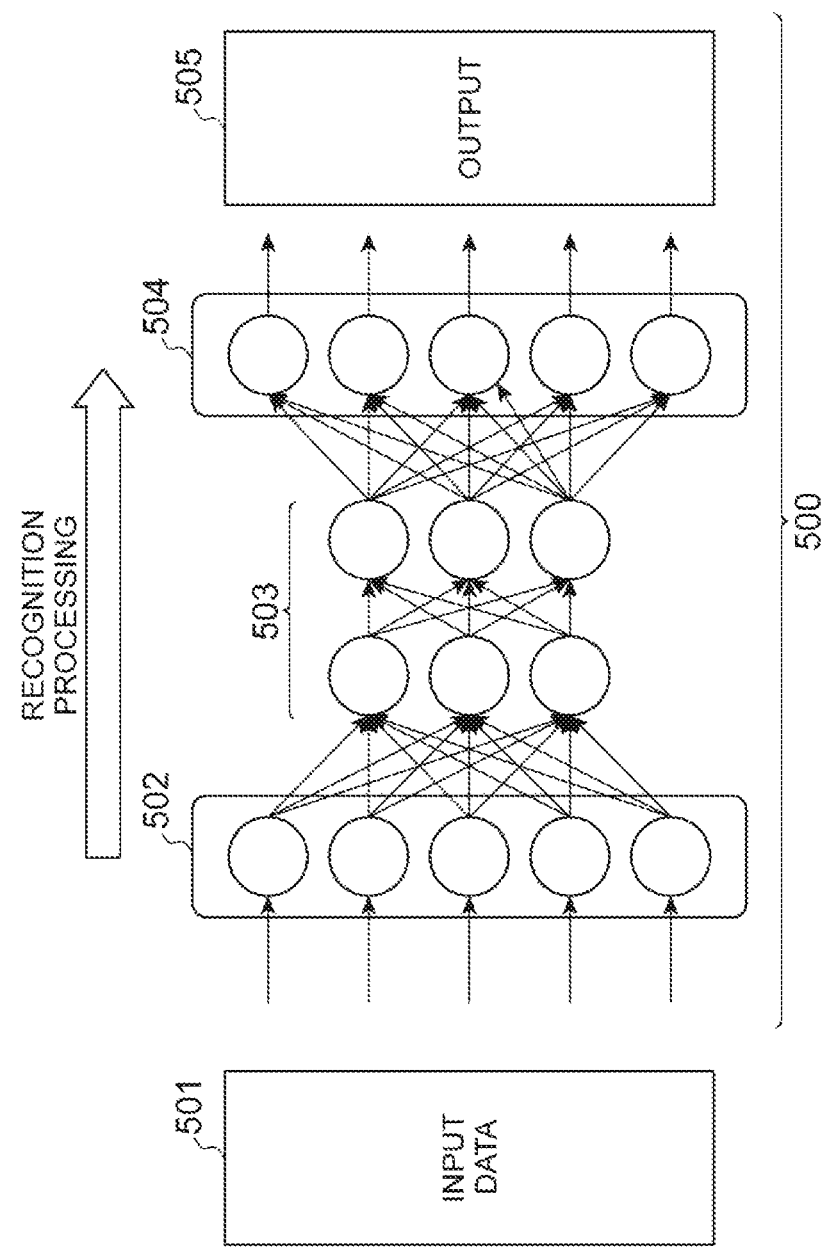
FIG. 6 is a schematic diagram of a neural network in an anomaly determination unit.

FIG. 6 is a schematic diagram of a neural network in the anomaly determination unit. As illustrated in FIG. 6, the neural network 500 in the anomaly determination unit 240 is a so-called hierarchical neural network, and a number of artificial neurons (nodes) shown by circles are connected to form a hierarchy. The hierarchical neural network comprises artificial neurons for input, artificial neurons for processing and artificial neurons for output.

The input data 501, which is a training image, is acquired by the training data acquisition unit 210. The input data 501 is sent from the training data acquisition unit 210 to the determination learning unit 241. The input data 501 is acquired by artificial neurons for input in the input layer 502. The artificial neurons for input are arranged in parallel to form an input layer 502. The input data 501 is distributed to artificial neurons for processing.

The artificial neurons for processing are connected to the artificial neurons for input. The artificial neurons for processing process the input according to the function of the artificial neurons and transmit the output to the other neurons. The artificial neurons for processing are arranged in parallel to form an intermediate layer 503. The intermediate layer 503 may be a plurality of layers.

The artificial neuron for output outputs a score to the outside. The number of artificial neurons for output is the same as the number of artificial neurons for input. The output artificial neurons are arranged in parallel to form an output layer 504. The output layer 504 outputs an image as an output 505.

In this manner, when an image to be processed is input, the neural network related to the anomaly determination unit performs a process of compressing information (e.g., feature value) included in the image to be processed, and then reconstructing the information included in the training image. A technique of compressing and reconstructing information of input data using a neural network is widely known as an autoencoder.

The determination learning unit 241 trains the neural network with the training image. Specifically, training for acquiring the ability to abstractly extract the feature value of the training image and training for acquiring the ability to reconstruct data based on the extracted feature value and reproduce the training image are performed. The determination learning unit 241 repeats the adjustment for reducing the error between the training image and the reconstructed data in the neural network. At this time, the weight coefficient in each layer of the neural network is adjusted.

The determination inference unit 242 uses the neural network trained by the determination learning unit 241. The input image acquired by the acquisition unit 220 is sent to the determination inference unit 242. The feature value extracted from the input image is extracted. The feature value of the input image is converted into a feature vector of a predetermined dimension. In the determination inference unit 242, the calculation of data reconstruction is performed using the feature vector and the determined weight coefficient in the neural network. The operation of the neural network outputs a reconstructed image. An anomaly score is calculated from the difference between the reconstructed image and the input image. In the present embodiment, the anomaly score is calculated so as to approximate "1.0" as the difference between the reconstructed image and the input image increases. The anomaly score may be calculated on the basis of the feature value of either the input image or the reconstructed image, or may be calculated on the basis of the statistical amount of the difference pixel value between the input image and the reconstructed image.

In the embodiment described above, the autoencoder is applied to the determination learning unit 241, but other learning techniques such as One Class SVM (Support Vector Machine) may be applied.

[Feature Value at the Time of Anomaly Determination]

Figure 7A:
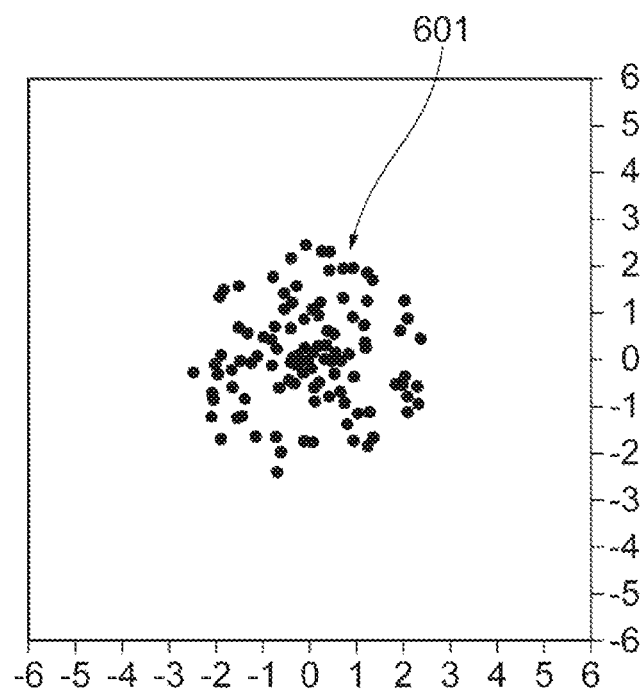
FIGS. 7A and 7B are diagrams illustrating dispersion of the feature value of the neural network in the anomaly determination unit.
Figure 7B:
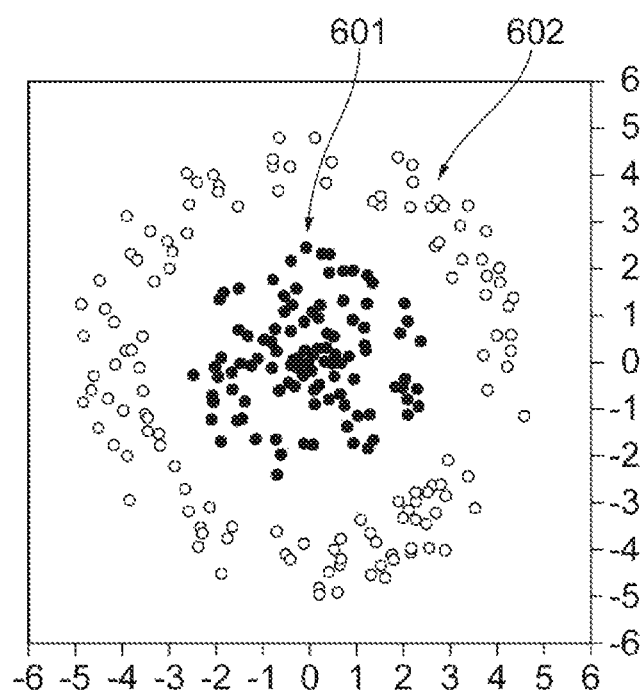

FIGS. 7A and 7B are diagrams illustrating the dispersion of the feature value of the neural network in the anomaly determination unit. In FIGS. 7A and 7B, the vertical axis and the horizontal axis indicate indices of feature value such as shapes and colors, respectively. FIG. 7A illustrates an example of the dispersion of the feature value of the training image in the high-dimensional space. In FIG. 7A, the dispersion of the feature value extracted from the training image is plotted as a point group 601. FIG. 7B illustrates an example of the dispersion of the feature value of the input image (the subject is a defective electronic component P) in the high-dimensional space. In FIG. 7B, the dispersion of the feature value extracted from the input image is plotted as a point group 601 and a point group 602. Comparing FIGS. 7A and 7B, it is understood that the extracted feature values are different. As described above, the neural network in the anomaly determination unit can extract a feature value (point group 602) different from the feature value of the training image when the subject is a defective object. Such a difference in the dispersion of the feature value may be used as an anomaly score.

[Correlation Between Classification Score, Anomaly Score and Determination Result]

Figure 8:
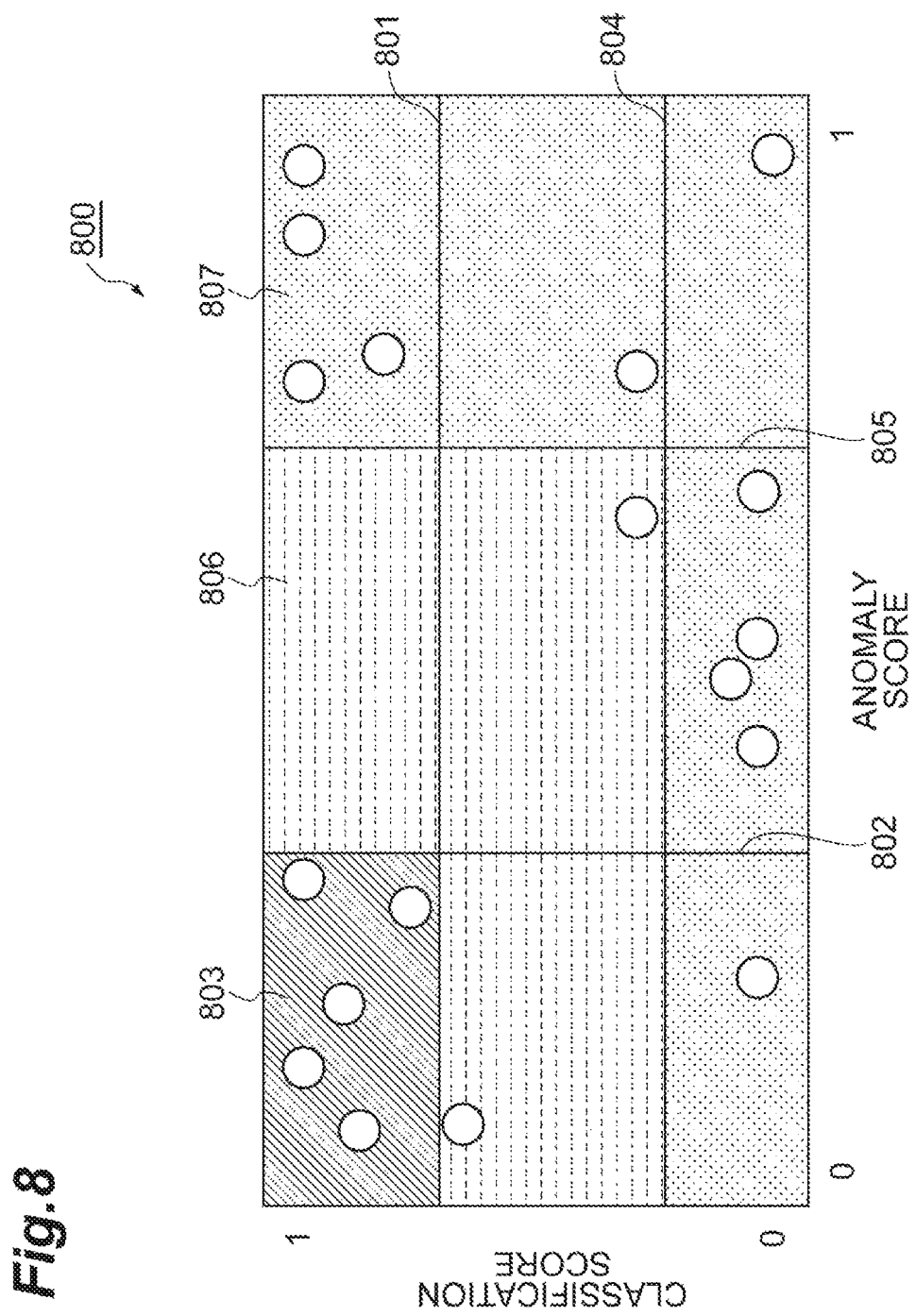
FIG. 8 is a graph illustrating the relationship between a classification score, an anomaly score and a determination result.

FIG. 8 is a graph illustrating the relationship between the classification score, the anomaly score and the determination result. In the graph (a scatter area 800) illustrated in FIG. 8, the horizontal axis represents the evaluation axis for the anomaly score, and the vertical axis represents the evaluation axis for the classification score. In FIG. 8, the anomaly score is in the range of 0 to 1, and the classification score is in the range of 0 to 1. The circle in the scatter area 800 is data of an input image having a classification score and an anomaly score as coordinate data. The closer the value on the vertical axis is to 0, the higher the likelihood of belonging to the bad category. The closer the value on the vertical axis is to 1, the higher the likelihood of belonging to the good category. The closer the value on the horizontal axis is to 0, the smaller the difference from the training image is. The closer the value on the horizontal axis is to 1, the greater the difference from the training image. The numerical value may be changed in setting the upper limit or the lower limit of the evaluation axis.

A classification score threshold 801 and an anomaly score threshold 802 are set in the scatter area 800. A good category area 803 is an area in which the classification score is equal to or greater than the classification score threshold 801 and the anomaly score is equal to or less than the anomaly score threshold 802. The input image relating to the data plotted in the good category area 803 is determined to be an image in which the subject is a non-defective electronic component P.

In addition to the classification score threshold 801 and the anomaly score threshold 802, thresholds for the classification score and the anomaly score may be additionally provided one by one. In the classification score, a classification difference threshold 804 is set to a value smaller than the classification score threshold 801. Preferably, the classification score threshold 801 and the classification difference threshold 804 may be set so that an indistinguishable area 806 (to be described later) has a predetermined range (e.g., 0.25 to 0.75) including the center value. In the anomaly score, an anomaly difference threshold 805 is set to a value larger than the anomaly score threshold 802. Preferably, the anomaly score threshold 802 and the anomaly difference threshold 805 may be set so that the indistinguishable area 806 (to be described later) has a predetermined range (e.g., 0.25 to 0.75) including the center value. As shown in FIG. 8, the indistinguishable area 806 and a bad category area 807 are partitioned by a combination of the classification score threshold 801, the anomaly score threshold 802, the classification difference threshold 804, and the anomaly difference threshold 805. The indistinguishable area 806 is an area excluding the good category area 803 in the scatter area 800, out of an area in which the classification score is equal to or greater than the classification difference threshold 804 and the anomaly score is equal to or less than the anomaly difference threshold 805. The bad category area 807 is an area of the scatter area 800 excluding the indistinguishable area 806.

In the example of FIG. 8, the fact that data is plotted in the indistinguishable area 806 means that either or both of the classification score and the anomaly score of the data are values that do not approximate 1 or 0 (approximately 0.25 to 0.75). That is, the input image relating to the data plotted in the indistinguishable area 806 may be a good image or a bad image. By determining such an input image as an indistinguishable image, the indistinguishable image can be left to another identification method such as human visual judgment. Therefore, in the identification in the appearance inspection apparatus 100 and the image identification apparatus 200, the identification accuracy of the entire system can be improved.

In the identification process (S970) described later, the data of the input image having the acquired classification score and the anomaly score is plotted on the scatter area. Based on which area is plotted, the input image is identified as a good image, a bad image, or an indistinguishable image. The number of thresholds set in the scatter area 800 is not limited to two or four, and any number of two or more may be set. The display control unit 260 may control the display unit 170 to display the adjustment status of the scatter area 800 and the threshold.

[Operation of Image Identification Apparatus]
[Learning Process]

Figure 9:
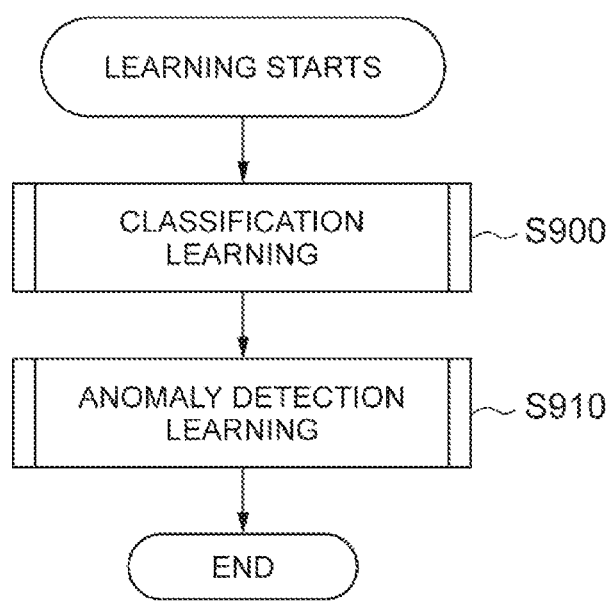
FIG. 9 is a flowchart of a learning process.

FIG. 9 is a flowchart of the learning process. The learning process in the image identification apparatus 200 includes a classification learning (S900) in the classification learning unit 231 and an anomaly detection learning (S910) in the determination learning unit 241. The order of the classifying learning process (S900) and the anomaly detection learning (S910) may be either first. Alternatively, a neural network trained in advance may be used in the image identification processing described later. In this case, either or both of the classification learning (S900) and the anomaly detection learning (S910) can be omitted.

Figure 10:
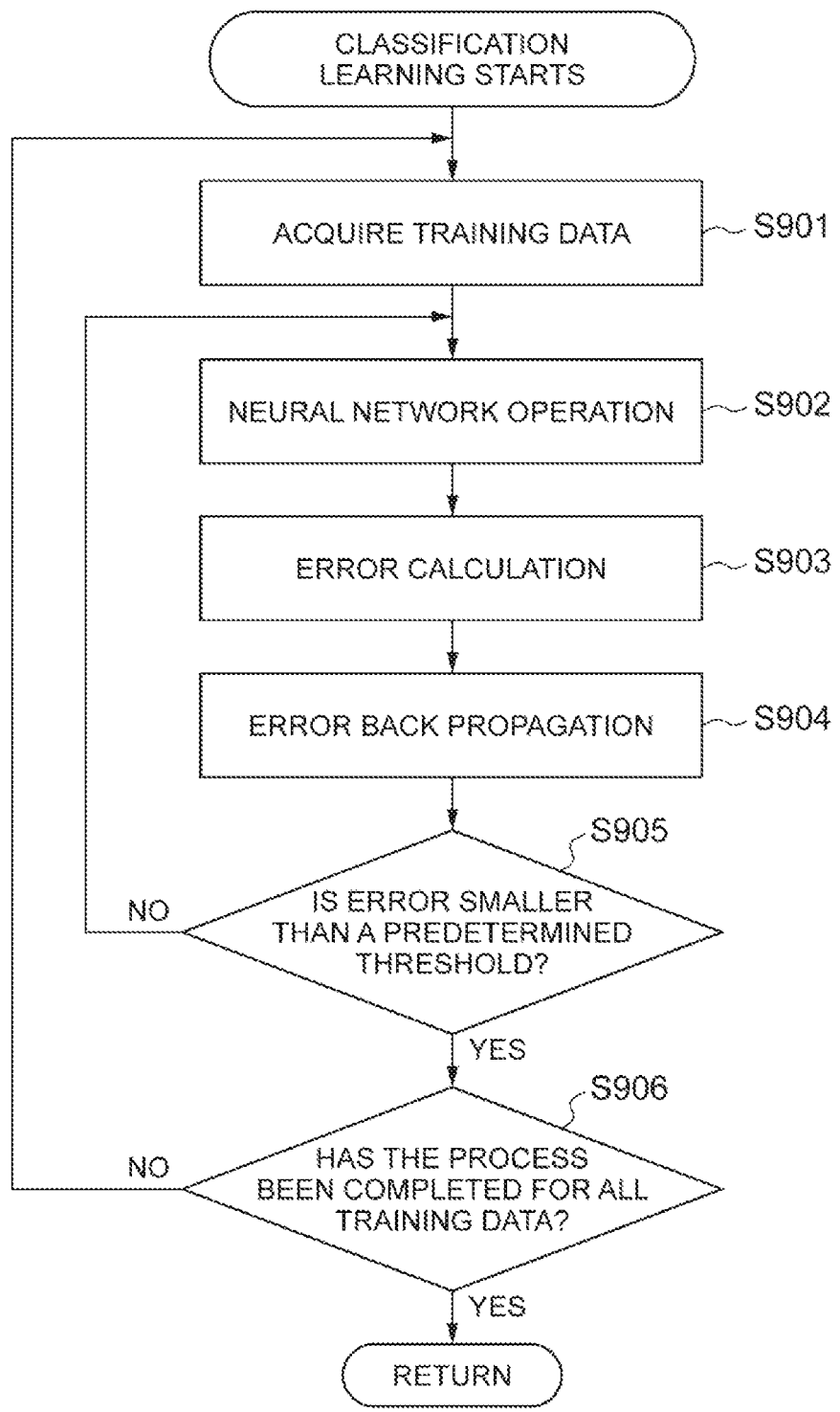
FIG. 10 is a flowchart of a neural network learning process in the classification unit.

FIG. 10 is a flowchart of a neural network learning process in the classification unit. The flowchart of FIG. 10 is a detailed S900 of the classification learning illustrated in FIG. 9. The classification learning unit 231 acquires training data from the training data acquisition unit 210 as a training data acquisition process (S901). The training data may be a training image to which a label of correct answer is given or a training image to which a label of incorrect answer is given. The classification learning unit 231 trains the neural network with the acquired training data as a S902. In this S902, a good score and a bad score of the input training images are outputted from the neural network. In the present embodiment, each of the good score and the bad score has a value in the range of 0.0 to 1.0, and the sum of the good score and the bad score is set to 1.0. The classification learning unit 231 calculates, as an error calculation process (S903), an error between the labels given to the training image and the scores outputted for the training image. The classification learning unit 231 adjusts the weight coefficients of the intermediate layers of the neural network by using the error calculated in the S903 as the S904 process. The classification learning unit 231 determines whether or not the error calculated in the S903 is smaller than a predetermined threshold as a threshold determination process (S905). If the error is not smaller than the predetermined threshold (S905:NO), processes of S902 to S905 are repeated. If the error is smaller than the predetermined threshold (S905:YES), the process proceeds to S906.

As a specific example of the neural network operation processing (S902) to the threshold determination processing (S905), a use case in which training images to which labels "1" of correct answers are given are input will be described. When the operation processing (S902) is performed on the training images for the first time, values such as "0.9" and "0.1" of the good score and the bad score are outputted from the neural network, respectively. Next, in the error calculation process (S903), the difference "0.1" between the label "1" of the correct answer and the label "0.9" of the good score is calculated. When a label of incorrect answer is given to the training image, a difference from the bad score is calculated. Next, in the error back propagation processing (S904), the weight coefficients of the intermediate layers of the neural networks are adjusted so that the error calculated in the error calculation processing (S903) becomes smaller. In this manner, the neural network is trained by repeating the adjustments of the weight coefficients until the error calculated in the error calculation process (S903) falls below predetermined thresholds.

Next, it is determined whether the process has been completed for all the training data (S906). When the processing has not been completed for all the training data (S906:NO), processes of S901 to S906 are repeated. When the process is completed for all the training data (S906:YES), the flowchart of FIG. 10 ends, and the process returns to the flowchart of FIG. 9.

Figure 11:
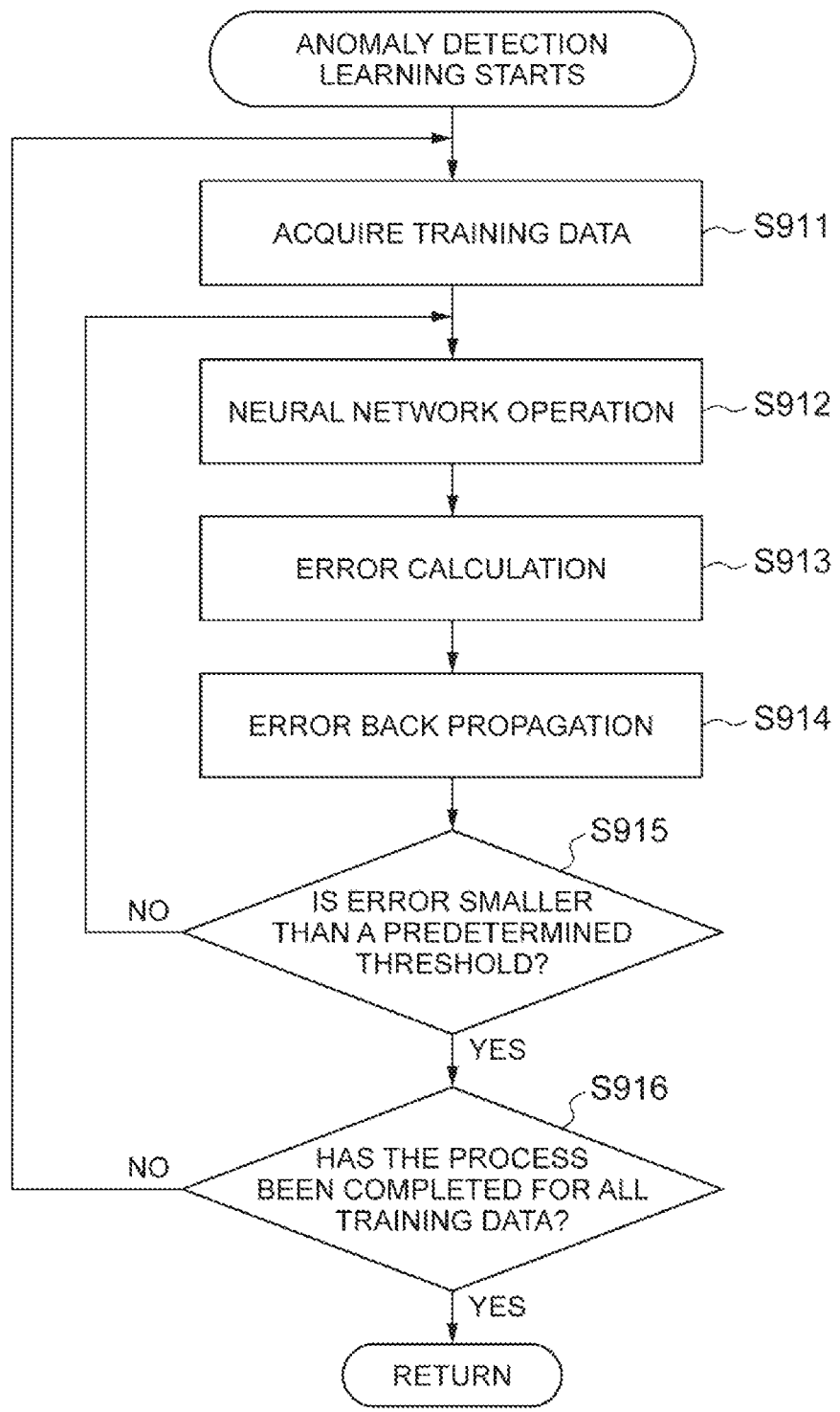
FIG. 11 is a flowchart of a neural network learning process in the anomaly determination unit.

FIG. 11 is a flowchart of a neural network learning process in the anomaly determination unit. The flowchart of FIG. 11 is a detailed S910 of the anomaly detection learning illustrated in FIG. 9. The determination learning unit 241 acquires training data from the training data acquisition unit 210 as a training data acquisition process (S911). In the present embodiment, the training data used in the anomaly detection learning is a training image in which the subject is a non-defective electronic component P. Alternatively, the training data used in the anomaly detection learning may be training images to which labels of correct answers are given, which are used in the classification learning (S900). The determination learning unit 241 trains the neural network with the acquired training data as an operation process (S912). In this operation process (S912), after compressing the feature value of the training image, calculation for reconstructing the feature value of the training image is performed. As it were, an attempt is made to reconstruct the training image once downscaled. In the error calculation processing (S913), the determination learning unit 241 calculates an error between the feature values of the training images and the feature values reconstructed by the calculation processing (S912). The determination learning unit 241 adjusts the weight coefficients of the intermediate layers of the neural network by using the error calculated in the S913 as the error back propagation process (S914). As a threshold determination process (S915), the determination learning unit 241 determines whether or not the error calculated by the S913 is smaller than a predetermined threshold. If the error is not smaller than the predetermined threshold (S915:NO), processes of S912 to S915 are repeated. If the error is smaller than the predetermined threshold (S915:Yes), the process proceeds to S916. As described above, by repeating the adjustment of the weight coefficients until the error calculated in the error calculation process (S913) falls below the predetermined thresholds, the neural network is trained so that the training image can be restored from any of the input images.

Next, it is determined whether the process has been completed for all the training data (S916). When the processing has not been completed for all the training data (S916:NO), processes of S911 to S916 are repeated. When the process is completed for all the training data (S916:YES), the flowchart of FIG. 11 ends, and the process returns to the flowchart of FIG. 9.

[Threshold Setting Process]

Figure 12:
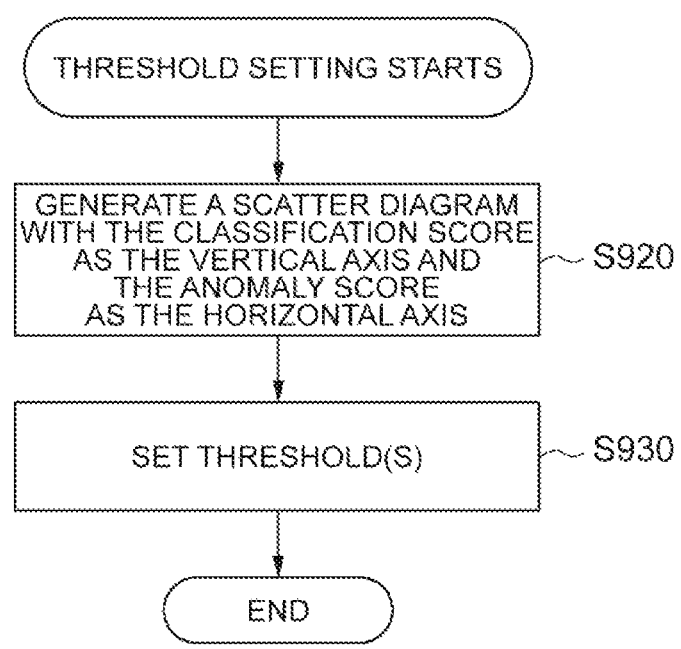
FIG. 12 is a flowchart of a threshold setting process.

FIG. 12 is a flowchart of a threshold setting process. The setting unit 280 generates a scatter diagram with the classification score as the vertical axis and the anomaly score as the horizontal axis, as a scatter diagram generation process (S920). The setting unit 280 sets the classification score threshold 801, the anomaly score threshold 802, the classification difference threshold 804, and the anomaly difference threshold 805 as the threshold setting process (S930) based on the setting condition by the user manipulation accepted by the reception unit 270. The scatter diagram shows a scatter area 800 for illustrating classification scores and anomaly scores obtained from an input image to be described later. When the threshold setting process (S930) is completed, the flowchart of FIG. 12 is completed.

[Image Identification Process (Example of Image Identification Method)]

Figure 13:
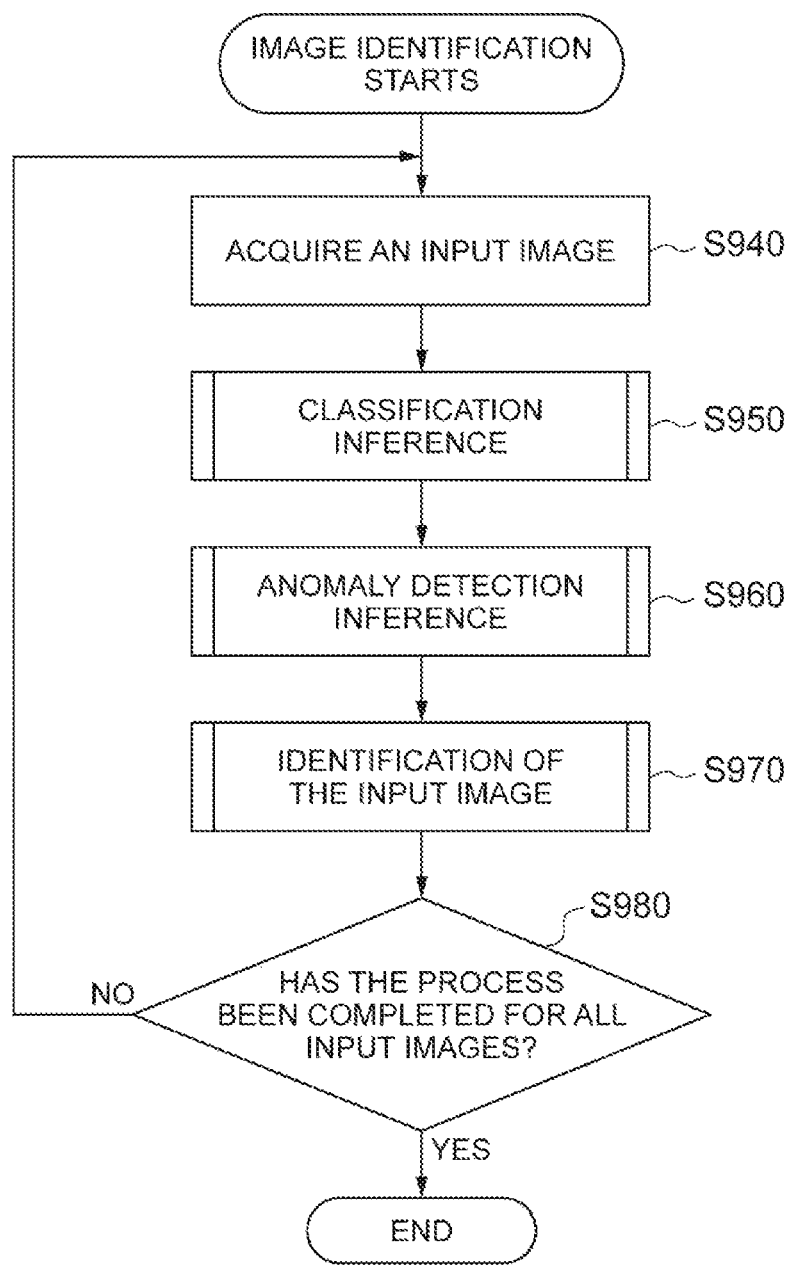
FIG. 13 is a flowchart of an image identification process.

FIG. 13 is a flowchart of an image identification process. The flowchart of FIG. 13 begins after completion of the flowcharts of FIGS. 9 to 11. The classification inference unit 232 and the determination inference unit 242 acquire an input image acquired by the acquisition unit 220 as an image acquisition process (S940: first process). The classification inference unit 232 calculates classification score of the input image as a classification inference (S950: second step). The determination inference unit 242 calculates anomaly score of the input image as an anomaly detection inference (S960: third step). The identification unit 250 identifies the input image based on the classification score, the anomaly score, the classification score threshold 801, the anomaly score threshold 802, the classification difference threshold 804, and the anomaly difference threshold 805 as an identification process (S970: a fourth step). As a completion determination process S980, the identification unit 250 determines whether or not the process has been completed for all of the input images. When the completion determination process (S980) is completed, the flowchart illustrated in FIG. 13 is completed.

[Classification Inference]

Figure 14:
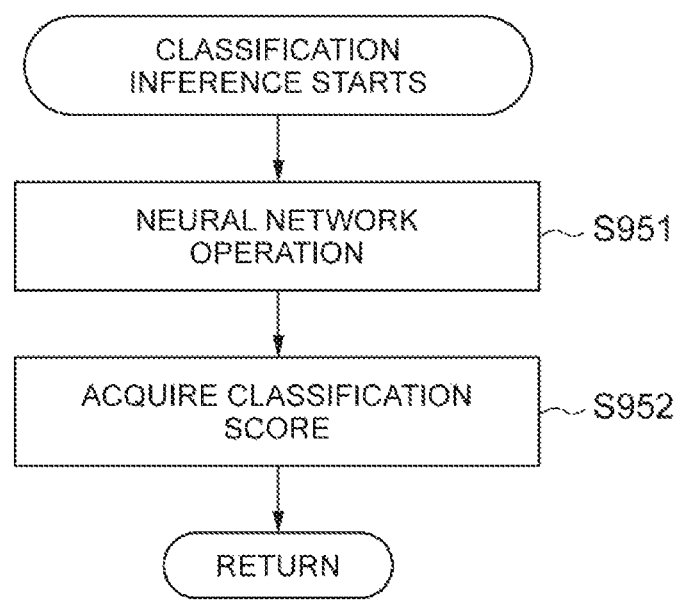
FIG. 14 is a flowchart of a classification inference.

FIG. 14 is a flowchart of the classification inference. The flowchart of FIG. 14 is a detailed S950 of the classification inference illustrated in FIG. 13. The classification inference unit 232 applies the input image to the neural network obtained by the classification learning (S900) as the operation process (S951) to perform an arithmetic operation on the input image. The input image includes an electronic component P as a subject. Unlike the training image, the input image is not labeled. The classification inference unit 232 acquires the classification score of the input image from the neural network as the score acquisition process (S952). Also in the inference phase, a good score and a bad score are output from the neural network for the input image. In the present embodiment, out of the scores output from the neural network, a good score is acquired as a classification score. When the score acquisition process (S952) is completed, the flowchart of FIG. 14 is completed, and the process returns to the flowchart of FIG. 13.

[Anomaly Detection Inference]

Figure 15:
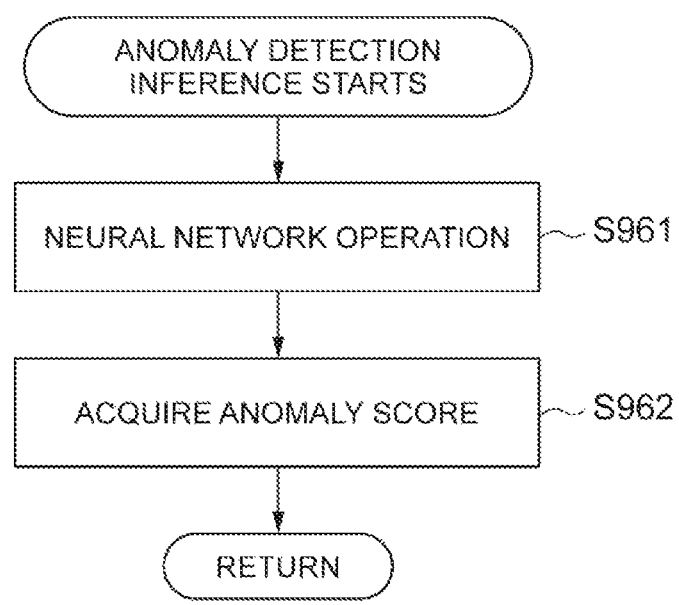
FIG. 15 is a flowchart of an anomaly detection inference.

FIG. 15 is a flowchart of an anomaly detection inference. The inference flowchart of FIG. 15 is a detailed S960 of the anomaly detection inference illustrated in FIG. 13. The determination inference unit 242 applies the input image to the neural network obtained by the anomaly detection learning (S910) as the operation process (S961) to perform an arithmetic operation on the input image. In the operation process (S912), after the feature value of the input image is compressed, the compressed feature value is reconstructed so as to approximate the feature value of the input image. The determination inference unit 242 can obtain an image reconstructed from the input image by performing S961. The determination inference unit 242 acquires an anomaly score of the input image from the neural network as a score acquisition process (S962). When the score acquisition process (S962) is completed, the flowchart of FIG. 15 is completed, and the process returns to flowchart of FIG. 13.

[Input Image Identification]

Figure 16:
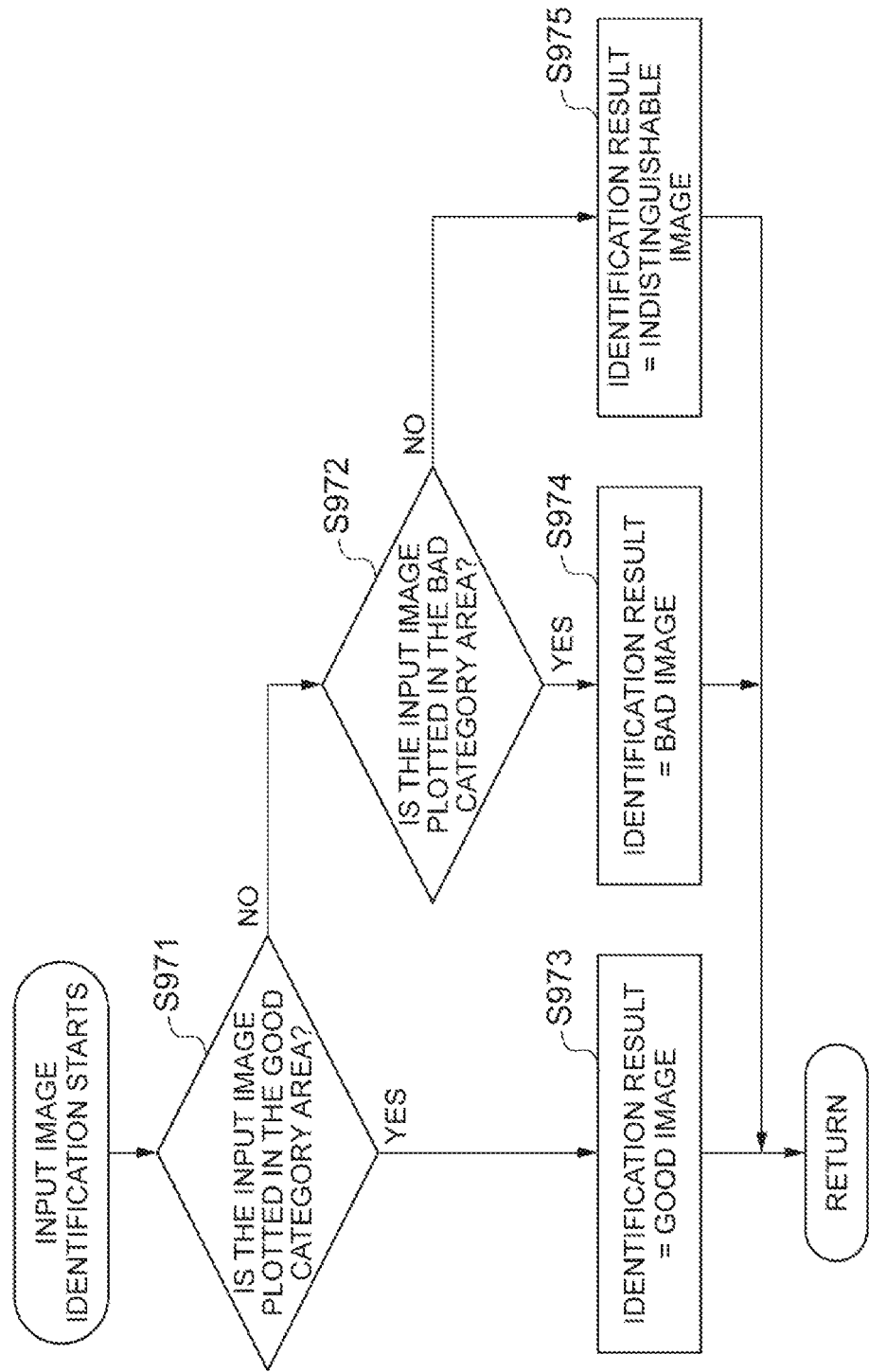
FIG. 16 is a flowchart of an input image identification process.

FIG. 16 is a flowchart of input image identification process. The flowchart of FIG. 16 is a detail of the identification process (S970) illustrated in FIG. 13. When the classification score and the anomaly score of the input image are plotted in the scatter area 800 as the good category determination process (S971), the identification unit 250 determines whether or not the data point is plotted in the good category area 803. When it is determined that the data point is plotted in the good category area 803, the identification unit 250 identifies the input image as a good image, as a good identification process (S973). When it is determined that the data point is not plotted in the good category area 803, the identification unit 250 determines whether or not the data point is plotted in the bad category area 807 as a bad category determination process (S972) when the classification score and the anomaly score of the input image are plotted in the scatter area 800. When it is determined that the data point is plotted in the bad category area 807, the identification unit 250 identifies the input image as a bad image, as a bad identification process (S974). When it is determined that the data point is not plotted in the bad category area 807, the identification unit 250 identifies the input image as an indistinguishable image, as an indistinguishable identification process (S975). When the good identification process (S973), the bad identification process (S974), or the indistinguishable process (S975) is completed, the flowchart of FIG. 16 is completed, and the process returns to the flowchart of FIG. 13.

OTHER EMBODIMENTS

Figure 17:
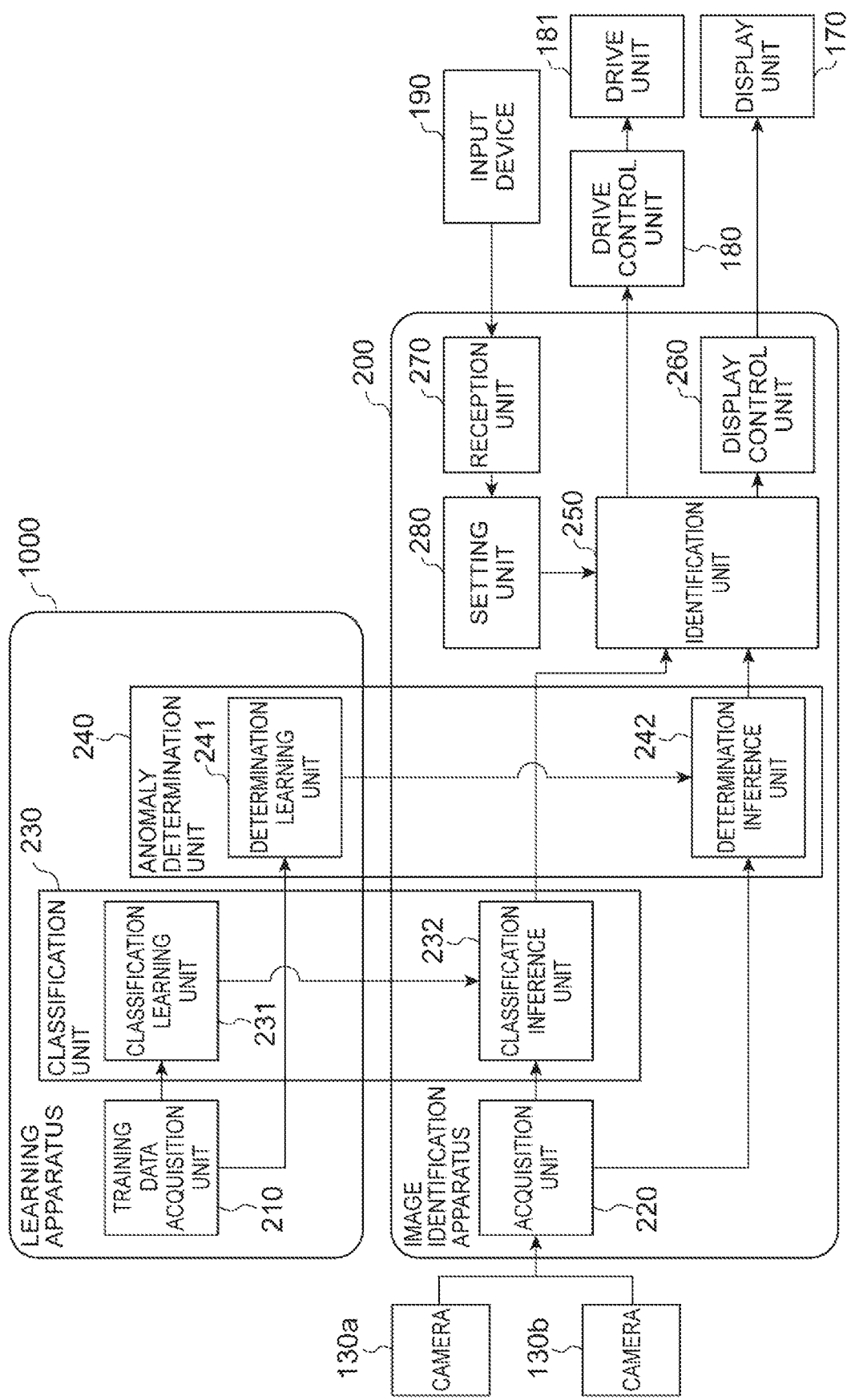
FIG. 17 is a functional diagram illustrating an example of the image identification apparatus and a learning apparatus according to another embodiment.

In the embodiment described above, the embodiment in which the classification learning unit 231 and the determination learning unit 241 are included in the image identification apparatus 200 has been described, but either or both of them may be included in an external apparatus of the image identification apparatus 200. FIG. 17 is a functional diagram illustrating an example of the image identification apparatus 200 and the learning apparatus 1000 according to another embodiment. As illustrated in FIG. 17, the training data acquisition unit 210, the classification learning unit 231, and the anomaly determination unit 241 are installed in the learning apparatus 1000. The classification neural network and the anomaly detection neural network trained by the learning apparatus 1000 are applied to the classification inference unit 232 and the determination inference unit 242, respectively, after the learning process is completed.

In general, learning processing using images in machine learning consumes a lot of computer resources. Therefore, when the image identification apparatus 200 executes the processes of the classification learning (S900) and the anomaly detection learning (S910), the apparatus costs of the image identification apparatus 200 may increase. By executing the processes of the classification learning (S900) and the anomaly detection learning (S910) on the learning apparatus 1000, the apparatus costs of the image identification apparatus 200 can be reduced.

[Program]

An image identification program for causing a computer to function as the image identification apparatus 200 will be described. The image identification program includes a main module, an acquisition module, a classification module, an anomaly determination module, and an identification module. The main module is a part that controls the entire apparatus. Functions delivered by executing the acquisition module, the classification module, the anomaly determination module, and the identification module are respectively the same as the functions of the acquisition unit 220, the classification unit 230, the anomaly determination unit 240, and the identification unit 250 of the image identification apparatus 200 described above.

SUMMARY OF EMBODIMENTS

In the image identification apparatus 200 according to the present embodiment, the classification unit 230 calculates the classification score indicating the degree of similarity between the input image and the training image, based on the neural network 400 that has been trained based on the training image to which the labels of correct and incorrect answers are given, and the input image. The anomaly determination unit 240 calculates an anomaly score indicating the degree of difference between the input image and the training image based on the neural network 500 that has been trained based on the training image and the input image. The input image is classified into a good image and a bad image based on the classification score and the anomaly score by the identification unit 250. In this manner, the image identification apparatus 200 can appropriately classify the input image into a good image or a bad image based on two different valuations of the classification score and the anomaly score.

The neural network 400 based on training images with labels of correct and incorrect answers generally cannot accurately determine input images that are not similar to training images (good images and bad images). This is because an image that is not similar to either a good image or a bad image is not a learning target in the classification learning (S900), and there is a high possibility that an inference result having a low reliability is outputted in the classification inference (S950). That is, when the separating hyperplane (FIG. 5B) is formed through the classification learning, since an image which is not similar to either the good image or the bad image is not considered, there occurs a case where the feature value of such an image is plotted in the good category area.

On the other hand, since the neural network 500 generated by learning only good images in the anomaly detection learning (S910) outputs the degree of difference between the training image and the input image as a score, the input image can be determined as an anomaly (bad image) according to the output score. However, with the neural network 500 alone, it is difficult to separate a minute defective portion, and it is difficult to determine a boundary between a good image and a bad image as in classification learning. The image identification apparatus 200 according to the present disclosure can combine the classification learning with the anomaly detection, so that the identification ability of the unlearned image, which is the weak point of the classification, can be covered by the anomaly detection while exhibiting the strong identification ability which is the advantage of the classification. As a result, it is possible to cope with "all defective products including unknown defective products". Furthermore, the possibility of erroneous classification determination for an unknown image (unknown defective product) can be ensured by anomaly detection.

In the image identification apparatus 200 according to the present embodiment, a threshold can be prepared and classified for each score. In the image identification apparatus 200 according to the present embodiment, since the user can set the classification score threshold 801 and the anomaly score threshold 802, classification close to the visual classification of the user can be realized. Since the image identification apparatus 200 can visualize the classification score threshold 801, the anomaly score threshold 802, and the result data in the scatter area 800, the user can intuitively understand the relationship between the data and the threshold. The image identification apparatus 200 can calculate an anomaly score by using an autoencoder that reconstructs a training image from an input image.

Although embodiments of the present disclosure have been described above, the present disclosure is not limited to the above-described embodiments. For example, the appearance inspection apparatus 100 may include a reversing device for reversing the direction of the electronic component P. For example, the training data acquisition unit 210, the acquisition unit 220, the classification unit 230, the anomaly determination unit 240, the identification unit 250, the display control unit 260, the reception unit 270, and the setting unit 280 in the image identification apparatus 200 may be composed as an aggregate in which devices prepared for each unit are connected via a communication network without being included in one device.

The image identification apparatus 200 does not need to have a component related to learning. For example, the image identification apparatus 200 may not include the training data acquisition unit 210, the classification learning unit 231, and the determination learning unit 241. In this case, the image identification apparatus 200 may acquire the neural network and the weight coefficient trained in advance from the outside.

What is claimed is:

1. An image identification apparatus comprising:
    an acquisition unit configured to acquire an input image;
    a classification unit configured to calculate a classification score of the input image based on a neural network having a weight coefficient in each layer determined to calculate the classification score indicating a degree of similarity between a training image and an image to be processed by machine learning based on training images of correct and incorrect answers;
    an anomaly determination unit configured to calculate an anomaly score of the input image based on a function approximator constructed by machine learning based on a training image of the correct answer to calculate the anomaly score indicating a degree of difference between the training image of the correct answer and the image to be processed; and
    an identification unit configured to classify the input image into a good image having a high degree of similarity to a training image of the correct answer or a bad image having low degree of similarity to a training image of the correct answer based on the classification score calculated by the classification unit and the anomaly score calculated by the anomaly determination unit, wherein the classification score indicating the degree of similarity is based on a hyper plane separating a first image of a good part and a second image of a bad part and the anomaly score is based on a statistic of a scatter area.

2. The image identification apparatus according to claim 1, wherein the identification unit classifies the input image into a good image or a bad image based on a classification score threshold predetermined for the classification score and an anomaly score threshold predetermined for the anomaly score.

3. The image identification apparatus according to claim 2, further comprising:
    a reception unit configured to receive a user operation; and
    a setting unit configured to set the classification score threshold and the anomaly score threshold based on the user operation received by the reception unit.

4. The image identification apparatus according to claim 2, further comprising:
    a display control unit configured to display the scatter area having a classification score evaluation axis related to the classification score and an anomaly score evaluation axis related to the anomaly score as coordinate axes; and
    wherein the display control unit displays data having coordinates of the classification score and the anomaly score of the input image, the classification score threshold, and the anomaly score threshold in the scatter area.

5. The image identification apparatus according to claim 1, wherein the function approximator is an autoencoder trained to reconstruct the information of a training image of the correct answer after compressing the information of the image to be processed; and:
    wherein the anomaly determination unit calculates the anomaly score of the input image based on the input image and the reconstructed image from the input image by the autoencoder.

6. The image identification apparatus according to claim 5, wherein the anomaly determination unit calculates the anomaly score of the input image based on a correlation between pixel values of the input image and the reconstructed image.

7. The image identification apparatus according to claim 1, wherein the function approximator is a support vector machine trained to separate a first area in which a feature vector extracted from an image having a low degree of difference from the training image of a correct answer is plotted and a second area in which a feature vector extracted from an image having a high degree of difference from the training image of a correct answer is plotted in a feature space; and
    wherein in a case where the feature vector extracted from the input image is plotted in the second area by the support vector machine, the anomaly determination unit calculates the anomaly score of the input image based on the training image of a correct answer and the input image.

8. The image identification apparatus according to claim 7, wherein the anomaly determination unit calculates the anomaly score of the input image using difference between a pixel value of a training image of the correct answer and a pixel value of the input image.

9. The image identification apparatus of claim 1, wherein the classification score indicating the degree of similarity is based on the hyper plane separating a first image of a good part and a second image of a bad part and the anomaly score indicating the degree of difference is based on the statistic, wherein the statistic separates a third image of an absent part from the second image of a bad part, and the statistic is an average or a variance.

10. The image identification apparatus of claim 9, wherein the statistic corresponds to a feature value of color.

11. The image identification apparatus of claim 10, wherein the anomaly score is further based on a second statistic, and the second statistic corresponds to a second feature value of shape.

12. The image identification apparatus of claim 1, wherein the classification score indicating the degree of similarity is based on the hyper plane separating a first image of a good part and a second image of a bad part and the anomaly score indicating the degree of difference between: 1) a first dispersion of images in which no subject appears at all or a different type of subject appears from 2) a second dispersion of images of bad parts.

13. An image identification method comprising:
   a first step of acquiring an input image;
   a second step of calculating a classification score of the input image based on a neural network having a weight coefficient in each layer determined to calculate the classification score indicating a degree of similarity between a training image and an image to be processed by machine learning based on training images of correct and incorrect answers;
   a third step of calculating an anomaly score of the input image based on a function approximator constructed by machine learning based on a training image of the correct answer to calculate the anomaly score indicating a degree of difference between a training image of the correct answer and the image to be processed; and
   a fourth step of classifying the input image into a good image having a high degree of similarity to a training image of the correct answer or a bad image having low degree of similarity to a training image of the correct answer based on the classification score calculated in the second step and the anomaly score calculated in the third step, wherein the classification score indicating the degree of similarity is based on a hyper plane separating a first image of a good part and a second image of a bad part and the anomaly score is based on a statistic of a scatter area.

14. A non-transitory recording medium recording an image identification program for causing a computer to function as:
   an acquisition unit configured to acquire an input image;
   a classification unit configured to calculate a classification score of the input image based on a neural network having a weight coefficient in each layer determined to calculate the classification score indicating a degree of similarity between a training image and an image to be processed by machine learning based on training images of correct and incorrect answers;
   an anomaly determination unit configured to calculate an anomaly score of the input image based on a function approximator constructed by machine learning based on the training image of correct answer to calculate the anomaly score indicating a degree of difference between the training image of the correct answer and the image to be processed; and
   an identification unit configured to classify the input image into a good image having a high degree of similarity to the training image of a correct answer or a bad image having low degree of similarity to the training image of the correct answer based on the classification score calculated by the classification unit and the anomaly score calculated by the anomaly determination unit, wherein the classification score indicating the degree of similarity is based on a hyper plane separating a first image of a good part and a second image of a bad part and the anomaly score is based on a statistic of a scatter area.

* * * * *